United States Patent [19]

Mikoshiba et al.

[11] Patent Number: 5,238,903
[45] Date of Patent: Aug. 24, 1993

[54] HEAT-TRANSFER DYE-DONATING MATERIAL

[75] Inventors: Hisashi Mikoshiba; Mitsugu Tanaka; Seiiti Kubodera, all of Kanagawa, Japan

[73] Assignee: Fuji Photo Film Co., Ltd., Kanagawa, Japan

[21] Appl. No.: 658,898

[22] Filed: Feb. 22, 1991

[30] Foreign Application Priority Data

Feb. 23, 1990 [JP] Japan .................................. 2-40942

[51] Int. Cl.$^5$ ..................... B41M 5/035; B41M 5/38
[52] U.S. Cl. .................................. 503/227; 418/195; 418/341; 418/342; 418/913; 418/914
[58] Field of Search ................... 8/471; 428/195, 913, 428/914, 341, 342; 503/227

[56] References Cited

FOREIGN PATENT DOCUMENTS 2-059395 2/1990 Japan .................................. 503/227

*Primary Examiner*—B. Hamilton Hess
*Attorney, Agent, or Firm*—Sughrue, Mion, Zinn, Macpeak & Seas

[57] ABSTRACT

Disclosed is a heat-transferring dye-donating material having a heat-transferring dye-donating layer containing a heat transferring dye on a support, which is characterized in that the heat-transferring dye is an azomethine dye where the benzene ring in the part corresponding to the developing agent is substituted by an atomic group represented by formula (Ia):

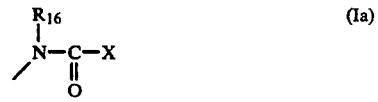

wherein X represents an alkoxy group, an aryloxy group or an amino group and $R_{16}$ represents a hydrogen atom or an alkyl group.

20 Claims, No Drawings

HEAT-TRANSFER DYE-DONATING MATERIAL

FIELD OF THE INVENTION

The present invention relates to a heat-sensitive transfer material.

BACKGROUND OF THE INVENTION

As techniques for formation of color hard copies, various processes such as the heat-sensitive transfer process, electrophotographic process and ink jet process have been widely investigated. The heat-sensitive transfer process is superior to the other processes in various points, since the maintenance and operation of the equipment is easy and the equipment itself and supplies for the equipment are low-priced. The heat-sensitive transfer process can be grouped into two types; one is a system where a heat-sensitive transfer material having a hot-melting ink layer as formed on a base film is heated with a thermal head so as to melt the ink and images or letters are recorded on a copying sheet with the transferred molten ink, and the other is a system where a heat-sensitive transfer material having a heat-transferring dye-containing colorant layer as formed on a base film is heated with a thermal head so as to transfer the dye to a copying sheet by, e.g., sublimation or diffusion. The latter heat-transferring system is especially advantageous for recording full-color images with high image quality, since the amount of the dye to be transferred to the copying sheet may be varied by controlling the energy to be applied at the thermal head and therefore gradation recording is possible.

However, the heat-transferring dyes usable in this system have various limitations and there are known only a few dyes which satisfy all the necessary characteristics and are satisfactorily usable in the system.

The necessary characteristics of the dyes are, for example, such that the dyes have preferable spectral characteristics for color reproduction, the dyes are heat-transferred with ease, the dyes are fast to light and heat, the dyes are resistant to various chemicals, the sharpness of the images to be formed from the dyes is hardly lowered, the images to be formed from the dyes are hardly re-transferred, the dyes may be produced with ease, and heat-sensitive transfer materials having the dyes may be produced with ease. Accordingly, development of heat-transferring dyes which satisfy the necessary characteristics has been desired in this technical field.

Hitherto, various heat-sensitive transferring dyes have been proposed. Above all, azomethine dyes described in JP-A-60-239289, JP-A-61-268493, JP-A-62-191191, JP-A-63-91287, JP-A-64-63194, JP-A-1-176591, JP-A-1-176590, JP-A-63-113077, JP-A-64-1591, JP-A-1-176592 and JP-A-63-205288 (the term "JP-A" as used herein means an "unexamined published Japanese patent application") have relatively excellent characteristics. However, these still have a problem that the spectral characteristics thereof are not satisfactory for sufficient color reproduction.

Furthermore, they were not satisfactory in light-fastness and heat-fastness. The improvement in light-fastness and heat-fastness has been further desired.

The following developing agent is described in *Photographic Science and Engineering*, vol. 8, number 3, May-June (1964).

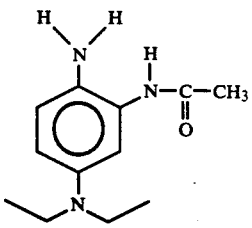

The absorption coefficient of the azomethine dye generated from the developing agent is described in Table IIIb of *Photographic Science and Engineering*, vol. 8, number 3, May-June (1964). It is described that the azomethine dye prepared from the developing agent has an absorption coefficient larger than those prepared from the other developing agents. However, since the developing agent is a remarkably instable compound, it was not practical that the developing agent is used as a synthetic intermediate to prepare a dye.

SUMMARY OF THE INVENTION

The object of the present invention is to provide a heat-sensitive transfer material containing a dye which is free from the above-mentioned problems.

The object of the present invention has been attained by a heat-transferring dye-donating material having a heat-transferring dye-donating layer containing a transferring dye on a support, which is azomethine dye where the benzene ring in the part corresponding to the developing agent is substituted by an atomic group represented by formula (Ia):

wherein X represents an alkoxy group, an aryloxy group or an amino group and R16 represents a hydrogen atom or an alkyl group.

Especially, the object of the invention has been attained by a heat-transferring dye-donating material, which has a heat-transferring dye-donating layer on a support and which is characterized in that the heat-transferring dye is one represented by a general formula

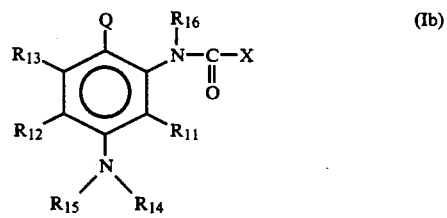

where Q represents a non-metallic atomic group necessary for forming a coloring system;

X represents an alkoxy group, an aryloxy group or an amino group;

$R_{11}$, $R_{12}$ and $R_{13}$ each represent a hydrogen atom or a non-metallic atomic group;

$R_{14}$ and $R_{15}$ each represent a hydrogen atom, an alkyl group, an aryl group or a heterocyclic group;

$R_{16}$ represents a hydrogen atom or an alkyl group; and $R_{12}$ and $R_{13}$, and/or $R_{12}$ and $R_{15}$, and/or $R_{15}$ and $R_{14}$, and/or $R_{11}$ and $R_{14}$, and/or X and $R_{11}$, and/or X and $R_{16}$, and/or $R_{16}$ and $R_{11}$ may be bonded to each other to form a ring structure.

DETAILED DESCRIPTION OF THE INVENTION

Examples of Azomethine dye where the benzene ring in the part corresponding to the developing agent is substituted by an atomic group represented by formula (Ia) include the dye represented by the following formulae:

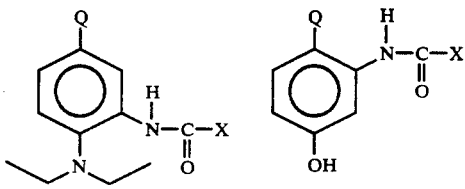

wherein X and Q are the same as defined in formula (Ib).

Azomethine dyes can be prepared by a coupling reaction of a coupler compound and a color developing agent. The coupler compounds include active methylene compounds, phenols, naphtols, and heterocyclic compounds such as pyrazole and pyrazolotriazole. The color developing agents include p-phenylenediamine derivatives and p-aminophenol derivatives. It is supposed in the present invention that the azomethine dye is prepared from the coupler compound and the color developing agent. That is, the term "the part corresponding to the developing agent" as used herein means the part derived from the color developing agent in the structure of the azomethine dye.

The azomethine dye is preferably substituted by the atomic group represented by formula (Ia) at ortho position with respect to Q'. The azomethine dye may be substituted by two or more atomic groups represented by formula (Ia).

Dyes of formula (Ib) will be explained in detail hereunder.

In formula (Ib), $R_{11}$ to $R_{13}$ independently represent a hydrogen atom or a non-metallic atomic group. Preferably, they are independently a hydrogen atom, an alkyl group, an alkoxy group, a halogen atom, an acylamino group, an alkoxycarbonyl group, a cyano group, an alkoxycarbonylamino group, an aryloxycarbonylamino group, an aminocarbonylamino group, a sulfonylamino group, a carbamoyl group, a sulfamoyl group, or an aryloxy group. As specific examples of the preferred groups, there are mentioned a hydrogen atom, an alkyl group (which may be substituted, preferably having from 1 to 12 carbon atoms, such as methyl, ethyl, isopropyl, butyl, methoxyethyl), an alkoxy group (which may be substituted, preferably having from 1 to 12 carbon atoms, such as methoxy, ethoxy, isopropoxy, methoxyethoxy), a halogen atom (such as fluorine, chlorine, bromine), an acylamino group (which may be substituted, preferably, for example, an alkylcarbonylamino group having from 1 to 10 carbon atoms, such as formylamino, acetylamino, propionylamino, isobutylamino, hexahydrobenzoylamino, pivaloylamino, trifluoroacetylamino, heptafluorobutyrylamino, chloropropionylamino, cyanoacetylamino, phenoxyacetylamino; a vinylcarbonylamino group having from 3 to 10 carbon atoms, such as acryloylamino, methacryloylamino, crotonoylamino; an arylcarbonylamino group having from 7 to 15 carbon atoms, such as benzoylamino, p-toluylamino, pentafluorobenzoylamino, o-fluorobenzoylamino, m-methoxybenzoylamino, p-trifluoromethylbenzoylamino, 2,4-dichlorobenzoylamino, p-methoxycarbonylbenzoylamino, 1-naphthoylamino; a heterylcarbonylamino group having from 5 to 13 carbon atoms, such as piconoylamino, nicotinoylamino, pyrrole-2-carbonylamino, thiophene-2-carbonylamino, furoylamino, piperidine-4-carbonylamino), a cyano group, an alkoxycarbonyl group (which may be substituted, preferably having from 2 to 10 carbon atoms, such as methoxycarbonyl, ethoxycarbonyl), an alkoxycarbonylamino group (which may be substituted, preferably having from 2 to 10 carbon atoms, such as methoxycarbonylamino, ethoxycarbonylamino, isopropoxycarbonylamino, methoxyethoxycarbonylamino, N-methylmethoxycarbonylamino, t-butoxycarbonylamino, hexyloxycarbonylamino), an aryloxycarbonylamino group (which may be substituted, preferably having from 8 to 13 carbon atoms, such as phenoxycarbonylamino, orthochlorophenoxycarbonylamino), an aminocarbonylamino group (which may be substituted, preferably having from 1 to 10 carbon atoms, such as methylaminocarbonylamino, dimethylaminocarbonylamino, butylaminocarbonylamino), a sulfonylamino group (which may be substituted, preferably having from 1 to 10 carbon atoms, such as methanesulfonylamino, ethanesulfonylamino, N-methylmethanesulfonylamino, phenylsulfonylamino), a carbamoyl group (which may be substituted, preferably, for example, an alkylcarbamoyl group having from 1 to 12 carbon atoms, such as methylcarbamoyl, dimethylcarbamoyl, butylcarbamoyl, isopropylcarbamoyl, t-butylcarbamoyl, cyclopentylcarbamoyl, cyclohexylcarbamoyl, allylcarbamoyl, methoxyethylcarbamoyl, chloroethylcarbamoyl, cyanoethylcarbamoyl, ethylcyanoethylcarbamoyl, benzylcarbamoyl, ethoxycarbonylmethylcarbamoyl, furfurylcarbamoyl, tetrahydrofurfurylcarbamoyl, phenoxymethylcarbamoyl; an arylcarbamoyl group having from 7 to 15 carbon atoms, such as phenylcarbamoyl, p-toluylcarbamoyl, m-methoxyphenylcarbamoyl, 4,5-dichlorophenoxycarbamoyl, p-cyanophenylcarbamoyl, p-acetylaminophenylcarbamoyl, p-methoxycarbonylphenylcarbamoyl, m-trifluoromethylphenylcarbamoyl, o-fluorophenylcarbamoyl, 1-naphthylcarbamoyl; a heterylcarbamoyl group having from 4 to 12 carbon atoms, such as 2-pyridylcarbamoyl, 3-pyridyl carbamoyl, 4-pyridylcarbamoyl, 2-thiazolylcarbamoyl, 2-benzothiazolylcarbamoyl, 2-benzimidazolylcarbamoyl, 2-(4-methyl)-pyridylcarbamoyl, 2-(5-methyl)-1,3,4-thidiazolylcarbamoyl), and a sulfamoyl group (having from 0 to 12 carbon atoms, such as methylsulfamoyl, dimethylsulfamoyl, butylsulfamoyl, phenylsulfamoyl).

Above all, $R_{11}$ to $R_{13}$ are especially preferably hydrogen atoms.

$R_{14}$ and $R_{15}$ independently represent a hydrogen atom, an alkyl group (which may be substituted, preferably having from 1 to 12 carbon atoms, such as methyl, ethyl, isopropyl, butyl, cyclopentyl, cyclohexyl, 2-methoxyethyl, 2-chloroethyl, 2-hydoxyethyl, 2-cyanoethyl, cyanomethyl, 2-methylsulfamoylethyl, 2-methylsulfonylaminoethyl, 2-methoxycarbonylethyl, 2-acetoxyethyl, methoxycarbonylmethyl, benzyl, allyl), an aryl group (which may be substituted, preferably having from 6 to 2 carbon atoms, such as phenyl, p-tolyl, m-chlorophenyl) or a heterocyclic group (for example, 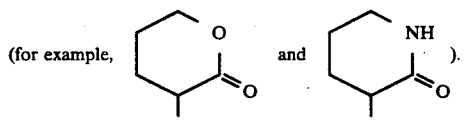 ).

More preferably, $R_{14}$ and $R_{15}$ independently represent an alkyl group having from 1 to 6 carbon atoms.

$R_{16}$ represent a hydrogen atom, or an alkyl group (which may be Substituted, preferably having from 1 to 12 carbon atoms, such as methyl, ethyl, isopropyl, butyl, cyclohexyl, 2-methoxyethyl, benzyl, allyl). $R_{16}$ may be bonded with X to form a ring structure.

More preferably, $R_{16}$ is a hydrogen atom.

X preferably represents an alkoxy group (which may be substituted, preferably having from 1 to 12 carbon atoms, such as methoxy, ethoxy, isopropoxy, butoxy, methoxyethoxy, cyclopentyloxy, cyclohexyloxy, 2-chloroethoxy, 2-cyanoethoxy, methoxycarbonyl-methyl, benzyloxy, allyloxy), an aryloxy group (which may be substituted, preferably having from 6 to 15 carbon atoms, such as phenoxy, p-methylphenoxy, p-methoxyphenoxy, m-chlorophenoxy, 2,4-dimthyl-phenoxy, p-ethylphenoxy), or an amino group (which may be substituted, preferably having from 0 to 10 carbon atoms, such as methylamino, dimethylamino, isopropylamino, butylamino, methoxyethylamino, anilino, thiazolylamino, benzothiazolylamino).

Especially preferably, X is an alkoxy group having from 1 to 4 carbon atoms.

In the above-mentioned groups, the alkyl moiety, aryl moiety and heterocyclic moiety may have one or more substituents.

In formula (Ib), Q represents a non-metallic group necessary for completing a coloring system and is preferably a group having a structure of the following general formula (II):

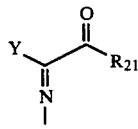 (II)

where $R_{21}$ represents an alkyl group, an amino group, an anilino group, an aryl group, or a heterocyclic group; Y represents a heterocyclic group, an aryl group, or

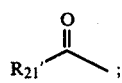;

and $R_{21}'$ represents an alkyl group, an aryl group, an amino group or an anilino group.

Preferably, $R_{21}$ is an anilino group (e.g., 2-chloroanilino, 2-methoxyanilino), or an amino group (e.g., t-butylamino).

Preferably, Y is

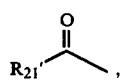, in which $R_{21}'$ is more preferably a t-butyl or phenyl group.

As another preferred structure of the group to be represented by Q, one having the following formula (III) is mentioned.

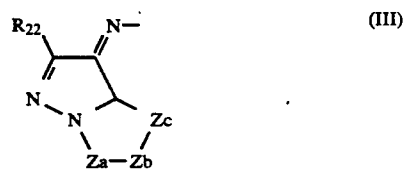 (III)

where $R_{22}$ represents a hydrogen atom, or a non-metallic substituent;
Za, Zb and Zc independently represent

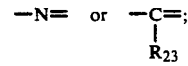

and $R_{23}$ represents a hydrogen atom, or a non-metallic substituent.

Of the groups of formula (III), more preferred are those of the following formulae (IV), (V), (VI), (VII), (VIII) and (IX).

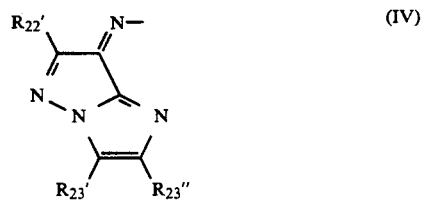 (IV)

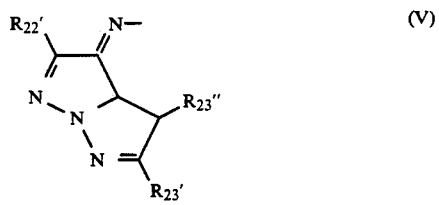 (V)

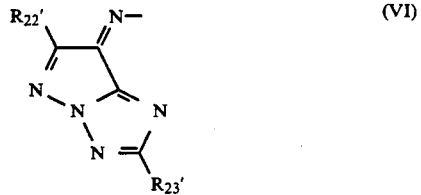 (VI)

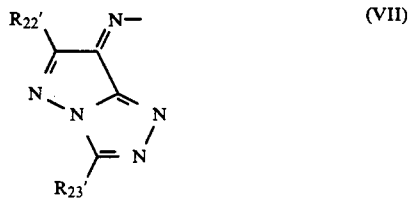 (VII)

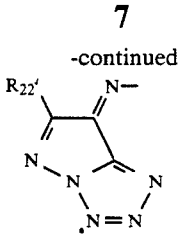
(VIII)

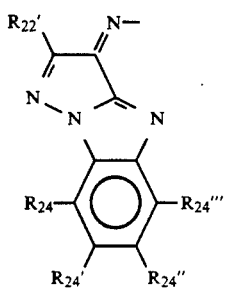
(IX)

In these formulae, $R_{22}'$ represents a hydrogen atom or a non-metallic substituent, preferably represents those defined as $R_{11}$, $R_{12}$ and $R_{13}$ in formula (Ib). As specific examples of $R_{22}'$, the groups as referred to with respect to formula (Ib) are mentioned. Above all, preferred are alkyl groups (e.g., t-butyl, methyl, ethyl), aryl groups (e.g., phenyl, o-chlorophenyl, m-nitrophenyl), alkoxy groups (e.g., ethoxy, methoxy), amino groups (e.g., anilino), and sulfonyl groups (e.g., methansulfonyl).

$R_{23}'$ and $R_{23}''$ independently represent a hydrogen atom, or a non-metallic substituent. Preferably, they are independently a hydrogen atom, an alkyl group, a cycloalkyl group, an aralkyl group, an aryl group, an alkoxy group, an aryloxy group, an amino group, an alkoxycarbonyl group, an acyl group, or an acylamino group.

Above all, an alkyl group (having from 1 to 12 carbon atoms) is further preferred. For instance, especially preferred are t-butyl and i-propyl groups and

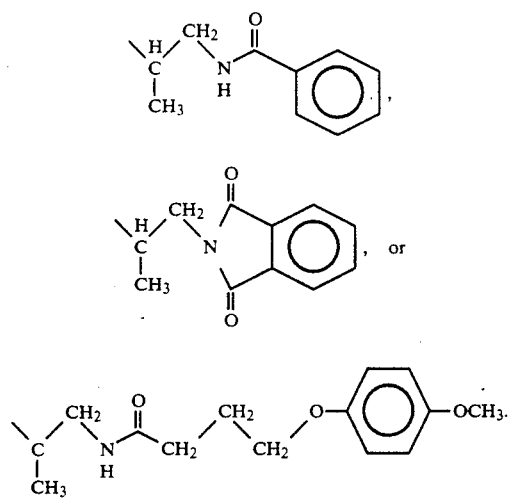

$R_{24}$, $R_{24}'$, $R_{24}''$, $R_{24}'''$ each represents a hydrogen atom or a non-metallic substituent, preferably each represents those described as $R_{11}$, $R_{12}$ and $R_{13}$ in formula (Ib). As specific examples of the groups, those referred to with respect to $R_{11}$, $R_{12}$ and $R_{13}$ are mentioned.

Most preferably, $R_{24}$, $R_{24}'$, $R_{24}''$, $R_{24}'''$ are hydrogen atoms.

As still another preferred structure of the group to be represented by Q, one having the following formula (X) is mentioned.

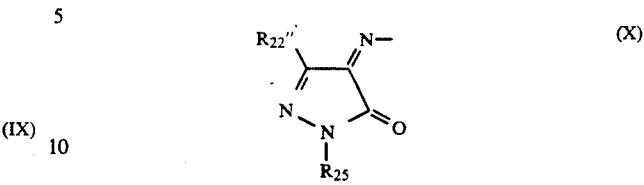
(X)

In formula (X) $R_{22}''$ represents a hydrogen atom or a non-metallic substituent, preferably represents a hydrogen atom, an acylamino group (e.g., acetylamino, benzoylamino), an anilino group (e.g., methylanilino, anilino, ortho-chloroanilino), or an alkyl group (e.g., ethyl, methyl).

$R_{25}$ represents a hydrogen atom, or a non-metallic substituent. Preferably, it is a hydrogen atom, an alkyl group (having from 1 to 12 carbon atoms, such as methyl, ethyl, methoxyethyl, benzyl, 2,4,6-trichlorophenyl, 2-phenethyl), or an aryl group (e.g., phenyl, trichlorophenyl, dichlorophenyl, 4-chlorophenyl, 4-aminophenyl).

As further preferred structures of the group to be represented by Q, ones having the following formula (XI) or (XII) are mentioned.

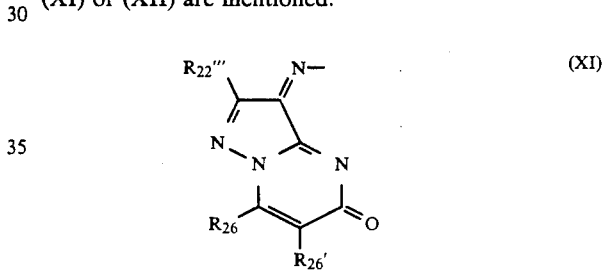
(XI)

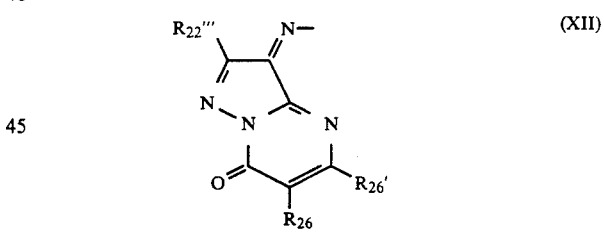
(XII)

In these formulae, $R_{22}'''$ represents a hydrogen atom or a non-metallic substituent, preferably represents an alkyl group (e.g., methyl, ethyl, t-butyl), or an aryl group (e.g., phenyl, o-chlorophenyl, m-chlorophenyl, 3,5-dichlorophenyl, m-cyanophenyl, m-trifluoromethylphenyl).

$R_{26}$ and $R_{26}'$ are the same as defined for $R_{23}$ of formula (III). As specific examples of the groups, those referred to with respect to formulae (IV), (V), (VI), (VII), (VIII) and (IX) are mentioned.

Preferably, $R_{26}$ and $R_{26}'$ independently represent a hydrogen atom or an alkyl group (e.g., methyl, ethyl), or they may be bonded to each other to form an aromatic ring.

As still another preferred structure of the group to be represented by Q, one having the following formula (XIII) is mentioned.

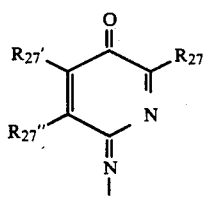

(XIII)

where $R_{27}$, $R_{27}'$ and $R_{27}''$ are the same as defined for $R_{11}$, $R_{12}$ and $R_{13}$ in formula (Ib). As specific examples of the groups, those referred to with respect to formula (Ib) are mentioned.

In formula (XIII), $R_{27}$ is most preferably an acylamino group (e.g., acetylamino, furoylamino, benzoylamino, pivaloylamino). $R_{27}''$ is preferably an acylamino group (e.g., pivaloylamino), or an alkyl group (e.g., methyl, ethyl); and $R_{27}'$ is preferably a hydrogen atom or a chlorine atom.

As still another preferred structure of the group to be represented by Q, one having the following formula (XIV) is mentioned.

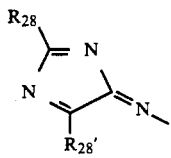

(XIV)

where $R_{28}$ and $R_{28}'$ are the same as defined for $R_{11}$, $R_{12}$ and $R_{13}$ in formula (Ib). Preferably, $R_{28}$ and $R_{28}'$ independently represent an aryl group (e.g., 2-acetylaminophenyl, phenyl), an alkyl group (e.g., methyl, ethyl), or a heterocyclic group (e.g., 2-furyl), an aminocarbonyl group (e.g., ethylaminocarbonyl, methylaminocarbonyl, isopropylaminocarbonyl), an oxycarbonyl group (e.g., methoxycarbonyl, ethoxycarbonyl, phenoxycarbonyl), or an acyl group (e.g., acethyl, bivaloyl, benzoyl).

As further preferred structures of the group to be represented by Q, ones having the following formula (XV) or (XVI) are mentioned.

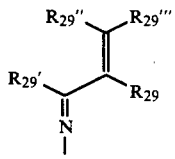

(XV)

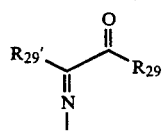

(XVI)

where $R_{29}$, $R_{29}'$, $R_{29}''$, $R_{29}'''$ are the same as defined for $R_{11}$, $R_{12}$ and $R_{13}$ in formula (Ib), with exception of a halogen atom. Above all, $R_{29}'$ is preferably a cyano group. $R_{29}$ in formula (XVI) is preferably a phenyl group, a naphthyl group, a furan ring, or a chromane ring. $R_{29}$ in formula (XV) is preferably an electron-attracting group such as cyano group, a phenyl group or a heterocyclic group, or is preferably an amino group. One of $R_{29}''$ and $R_{29}'''$ is preferably a cyano group.

In the above-mentioned groups, the alkyl moiety, aryl moiety and heterocyclic moiety may have one or more substituents.

Among the above-mentioned structures of (II) to (XVI) for the group of Q, those of formulae (II) and (III) are preferred.

The dyes for use in the present invention can contain an atomic group having an anti-fading effect in the dye molecule. Dyes having such an atomic group are especially preferred, when images having a high image fastness are desired.

The atomic group having an anti-fading effect may be bonded to any moiety of the groups $R_{11}$ to $R_{16}$, X and Q in the dyes. As the atomic group having an anti-fading effect, anyone as described in Japanese Patent Application No. 1-271078 can be employed. Specific examples of the atomic group having an anti-fading effect, which are usable in the present invention, are mentioned below. However, these are not limitative.

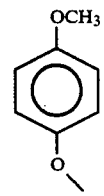

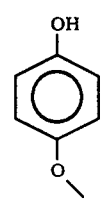

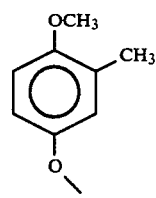

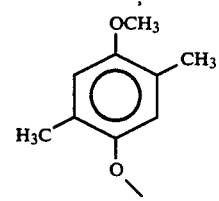

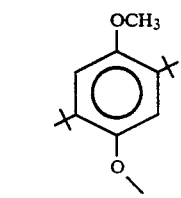

11
-continued
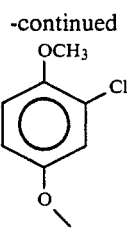
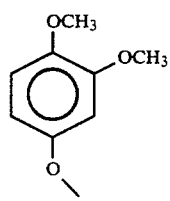
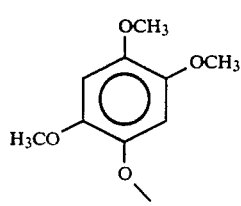
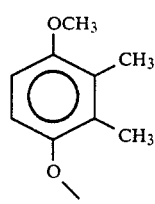
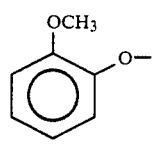
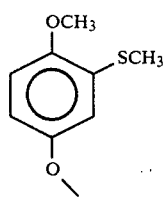
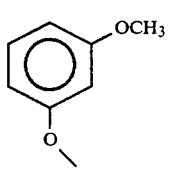
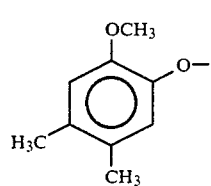
12
-continued
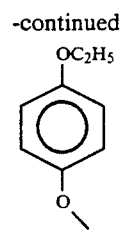
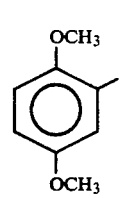
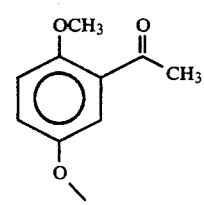
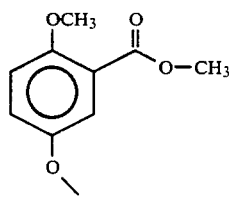
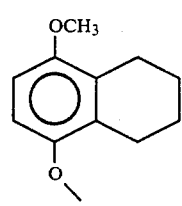
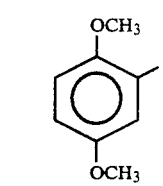
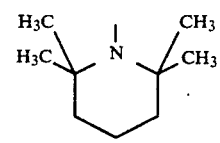
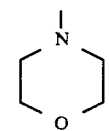

-continued
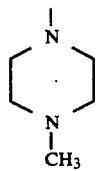
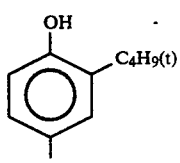
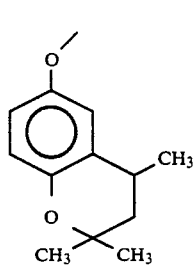
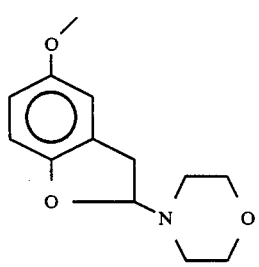
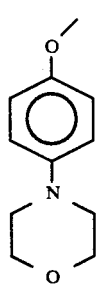
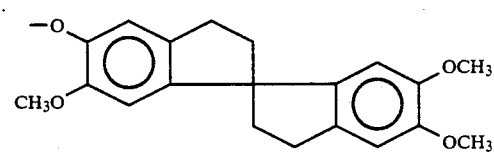
-continued
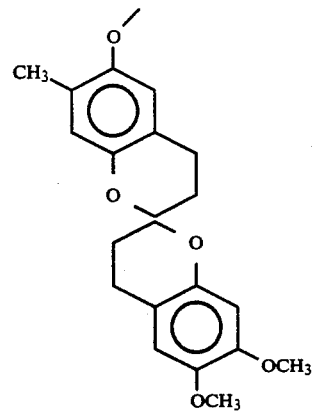
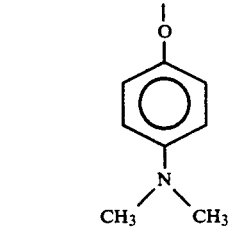
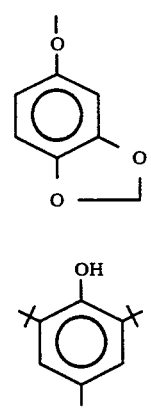
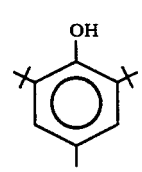
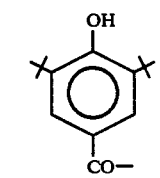
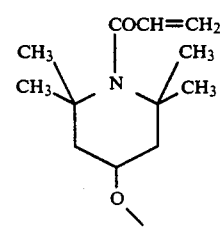

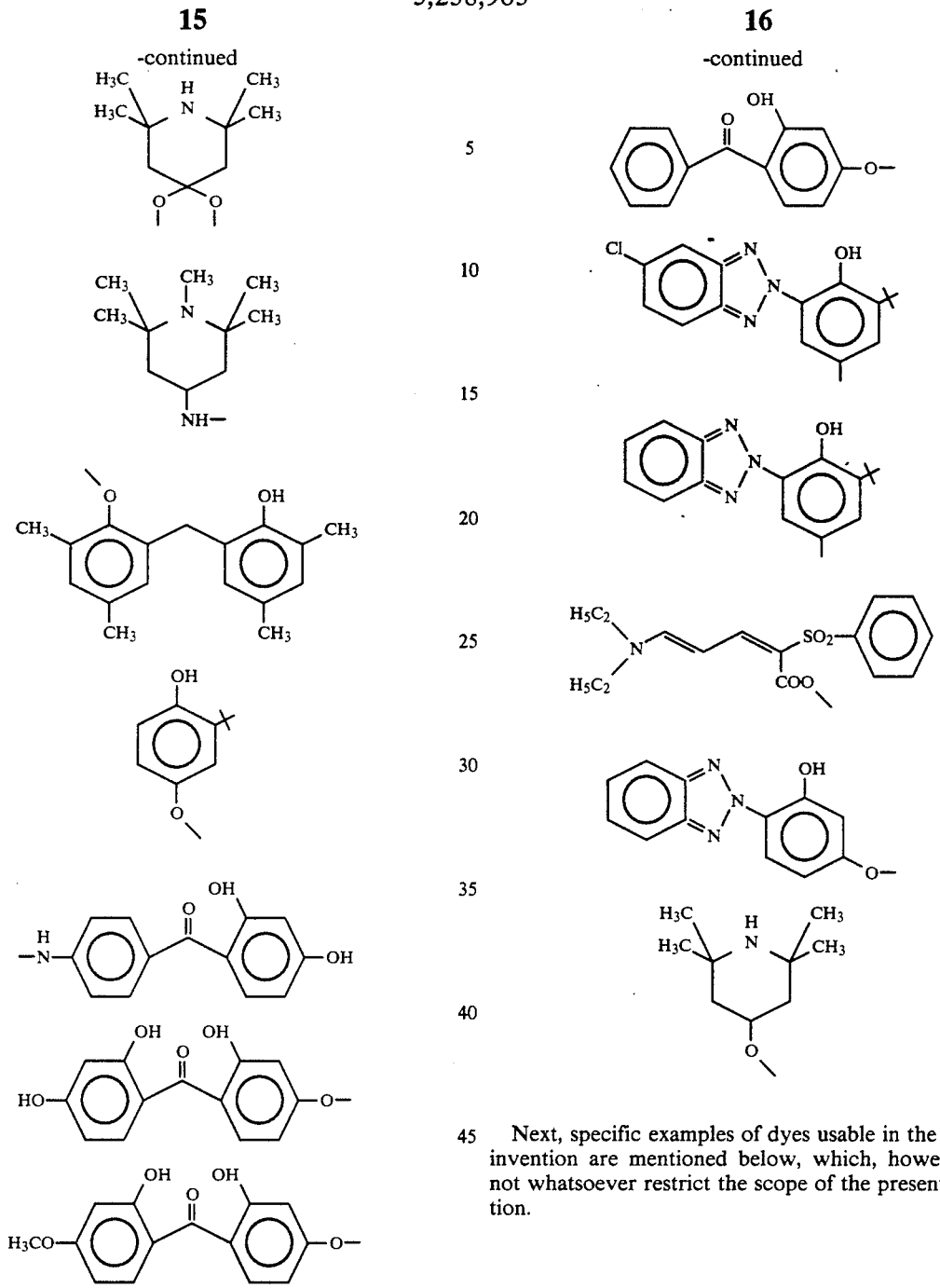
Next, specific examples of dyes usable in the present invention are mentioned below, which, however, do not whatsoever restrict the scope of the present invention.
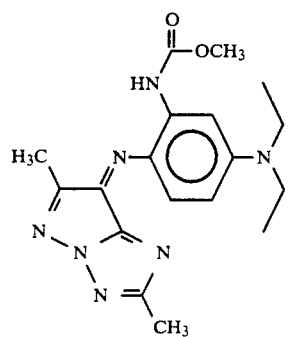
1.
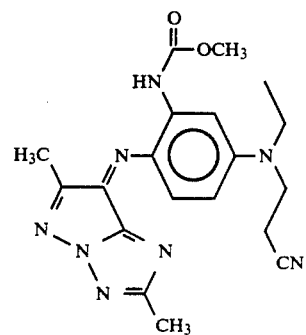
2.

3.
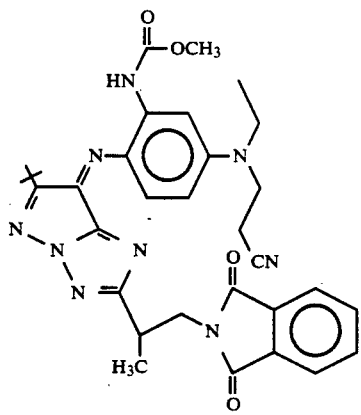
4.
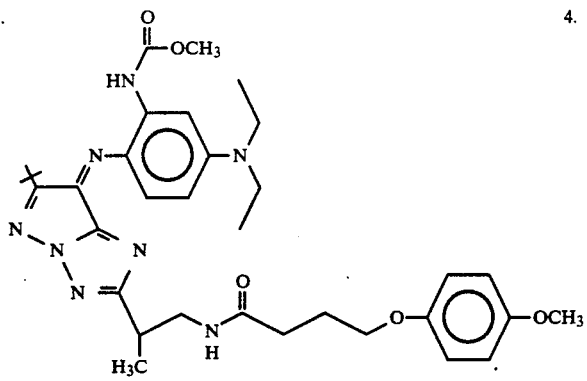
5.
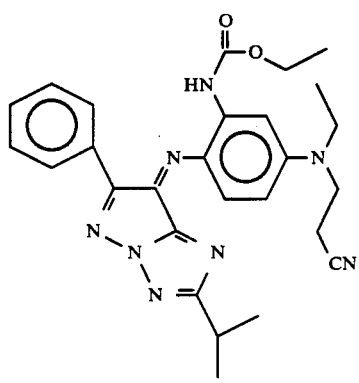
6.
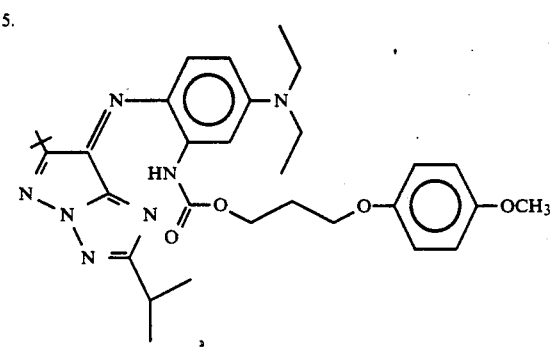
7.
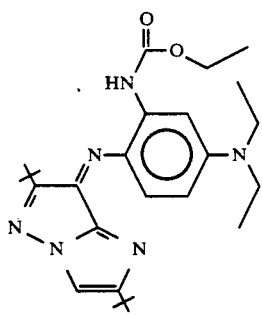
8.
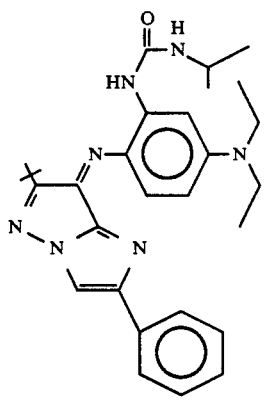
9.
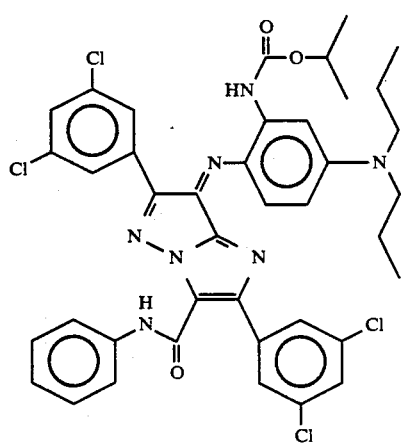
10.
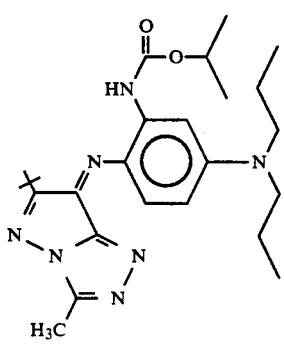

-continued
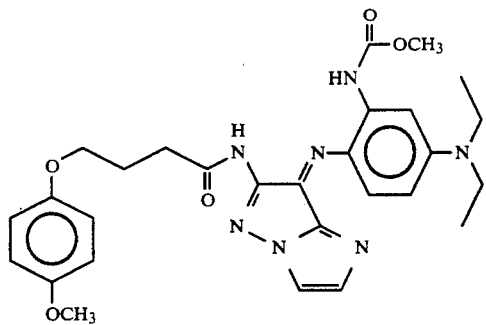
11.
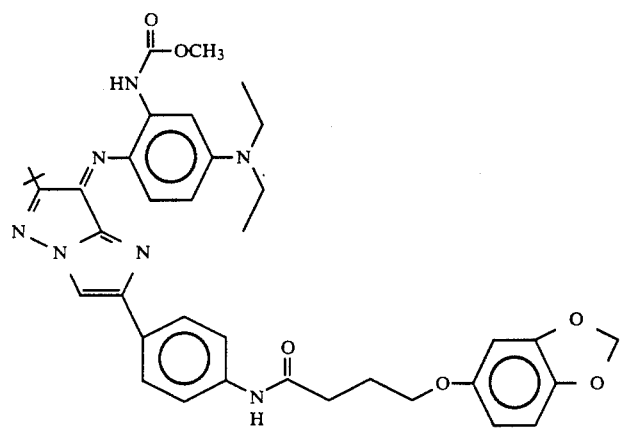
12.
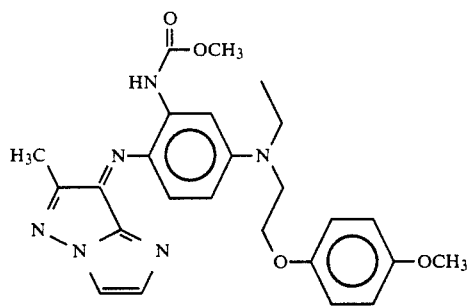
13.
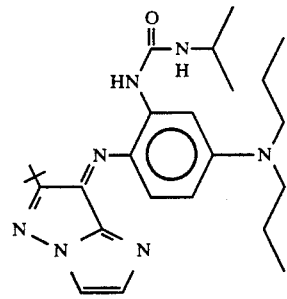
14.
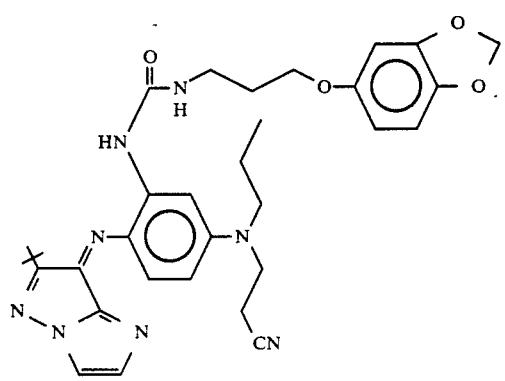
15.
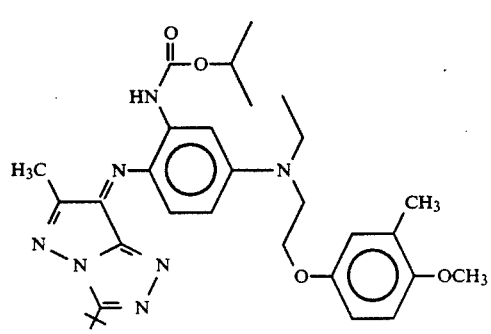
16.

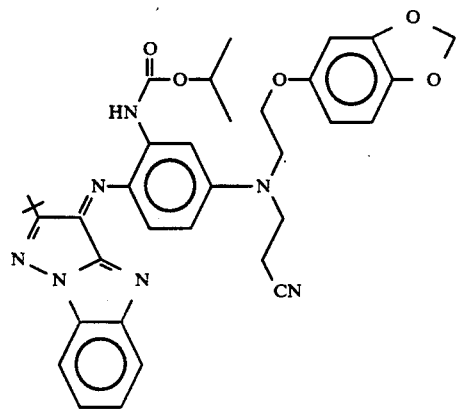
17.
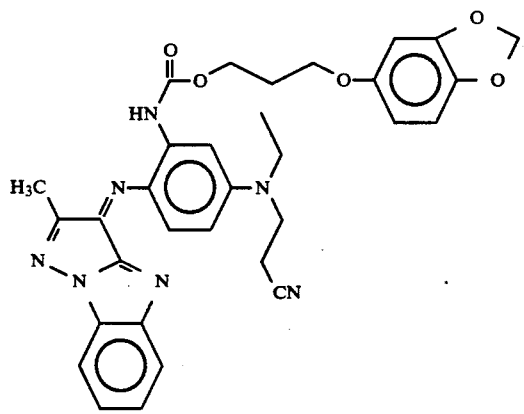
18.
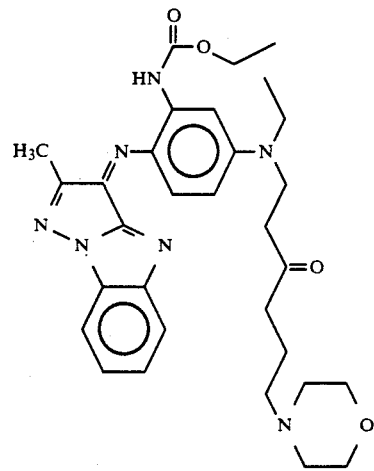
19.
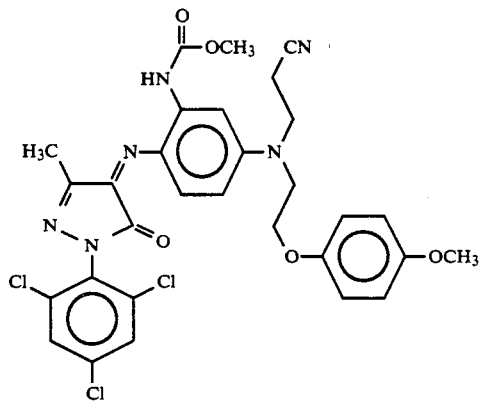
20.
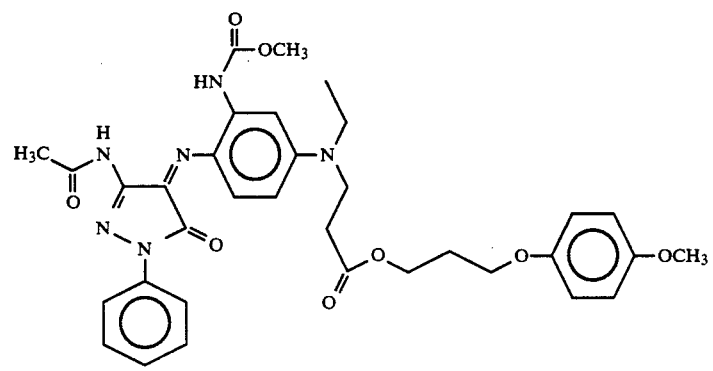
21.

-continued
22.
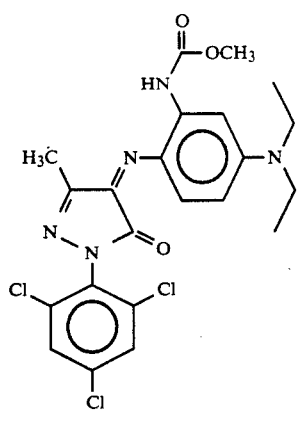
23.
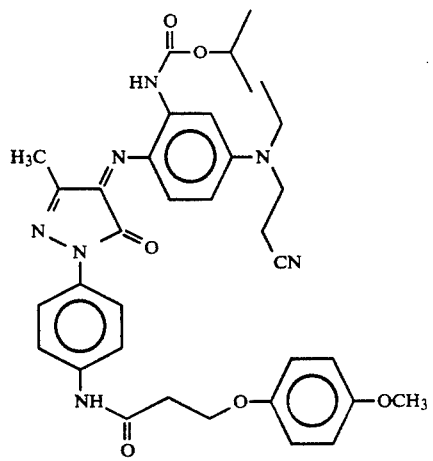
24.
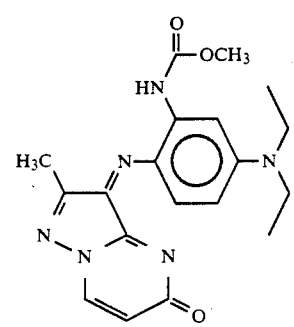
25.
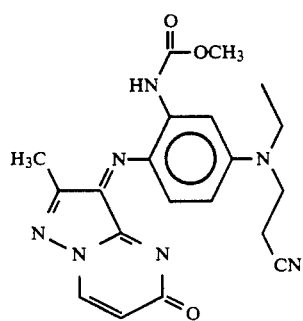
26.
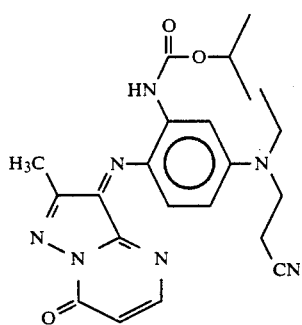
27.
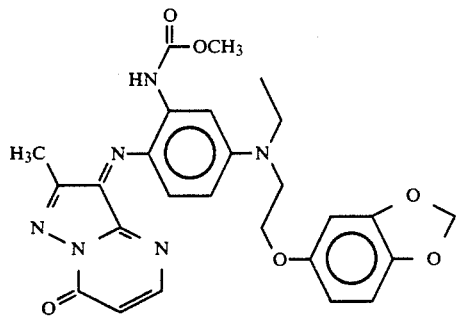
28.
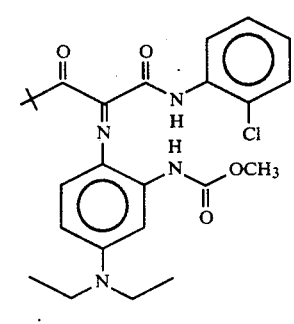
29.
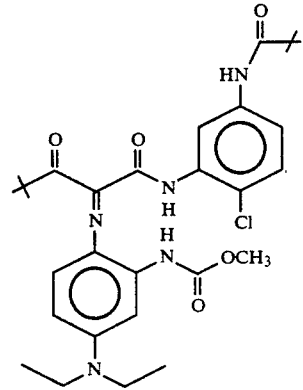

-continued
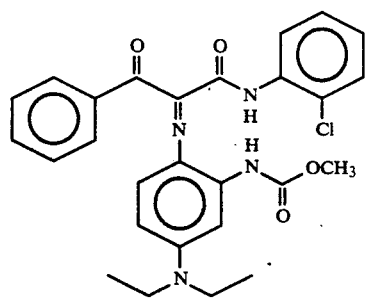
30.
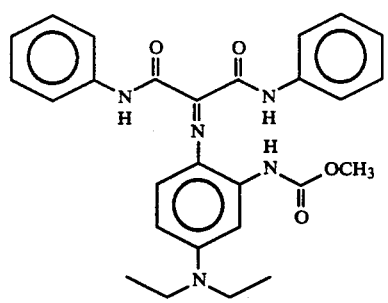
31.
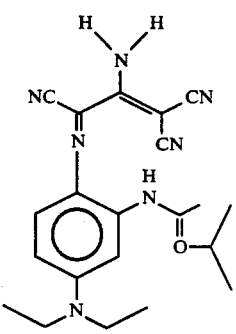
32.
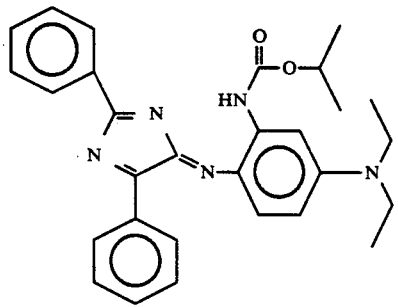
33.
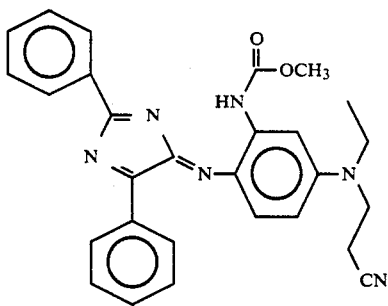
34.
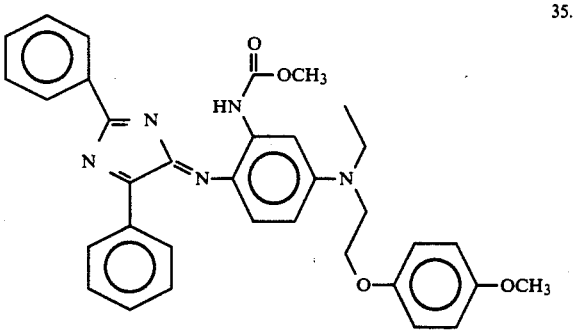
35.
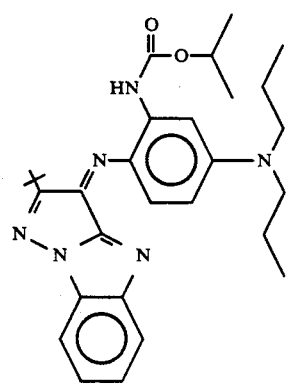
36.
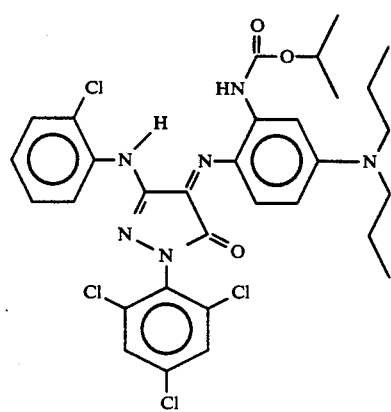
37.

38.
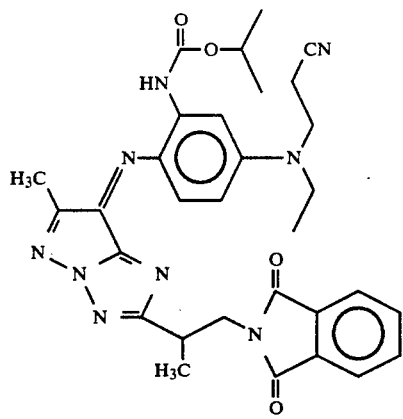
39.
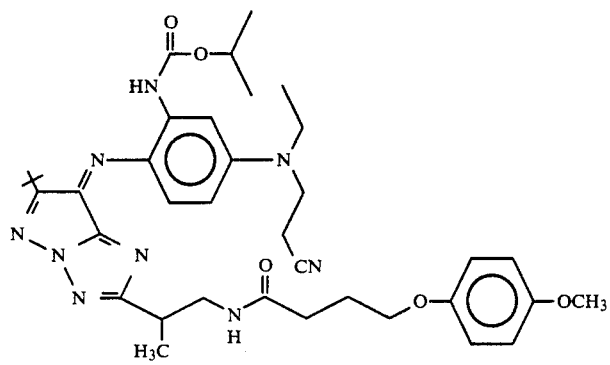
40.
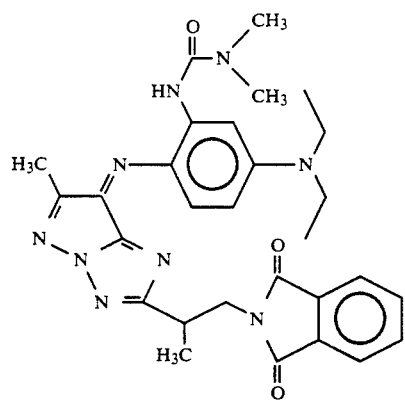
41.
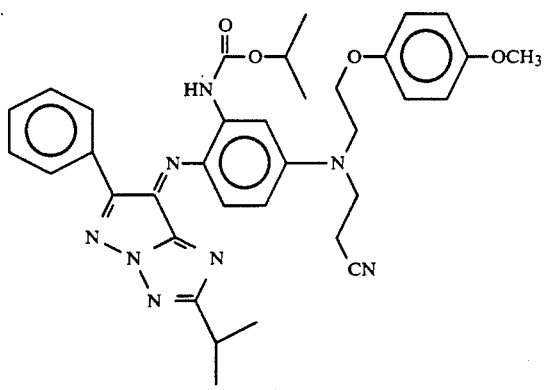
42.
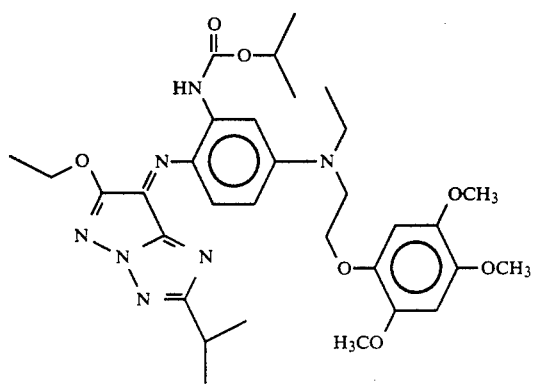
43.
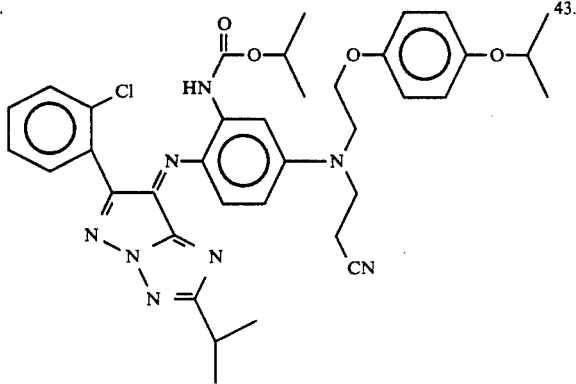

-continued
44.
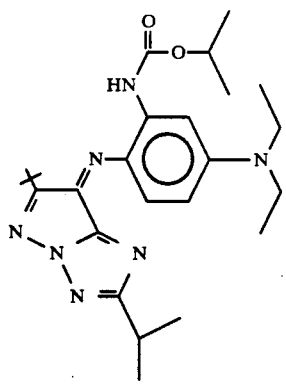
45.
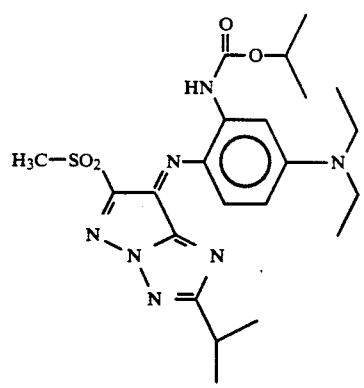
46.
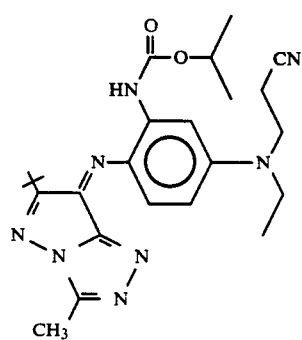
47.
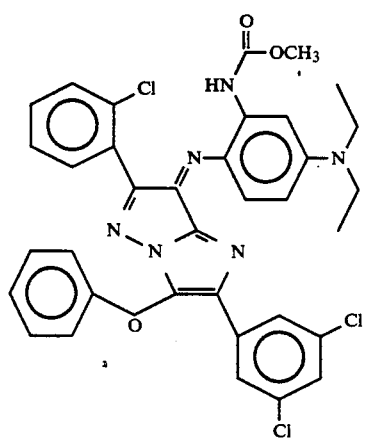
48.
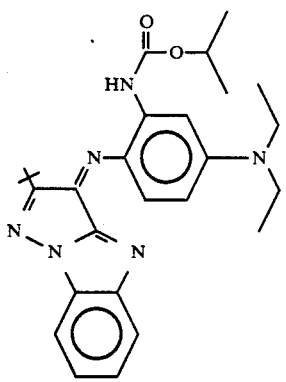
49.
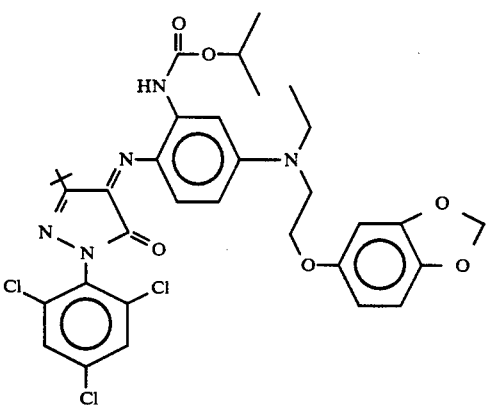
50.
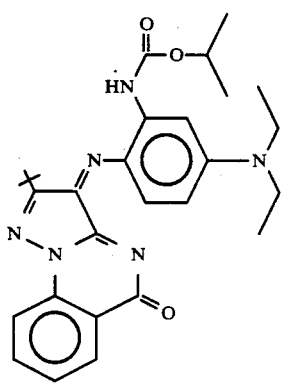
51.
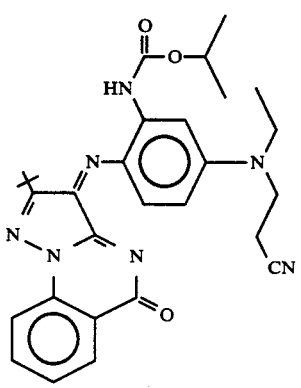

-continued
52.
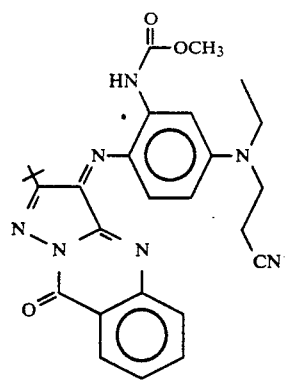
53.
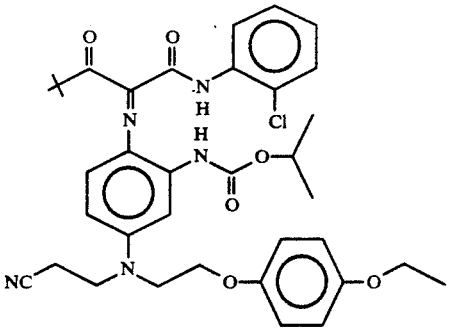
54.
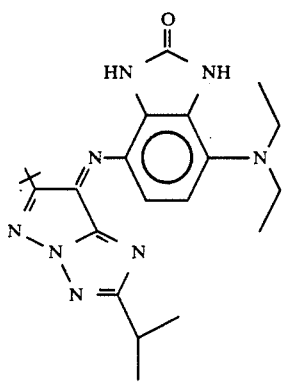
55.
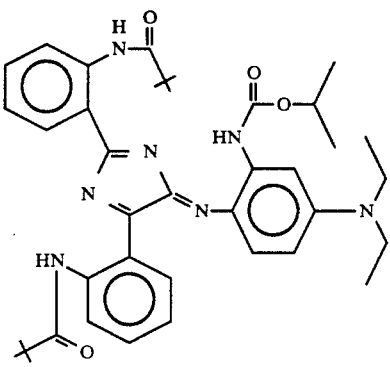
56.
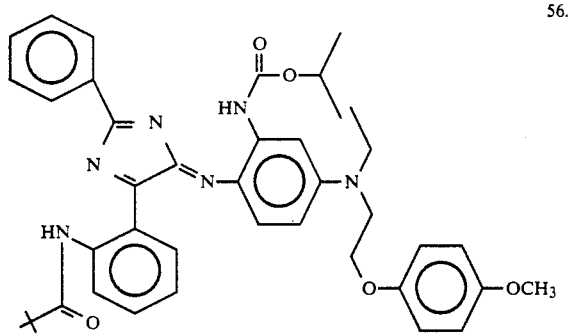
57.
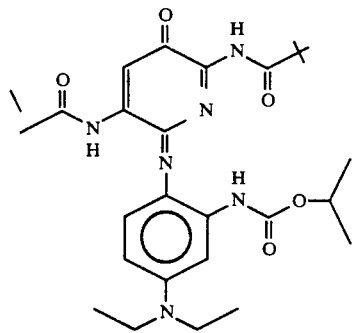
58.
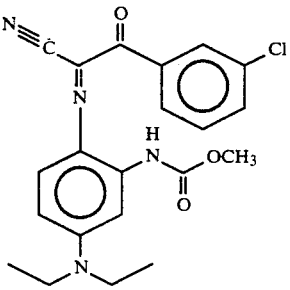
59.
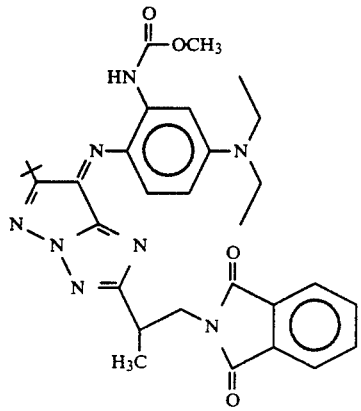

60.
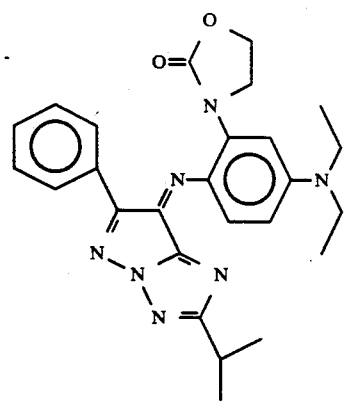
61.
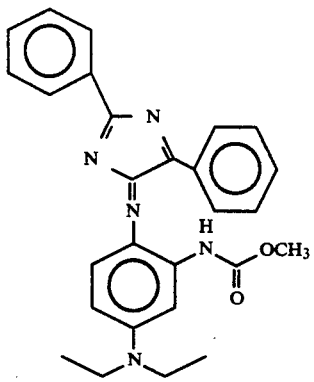
62.
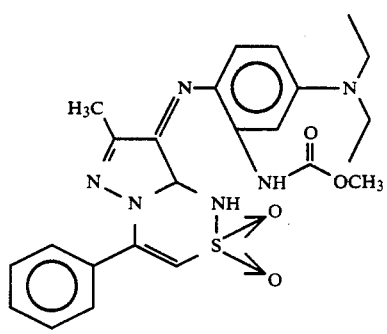
63.
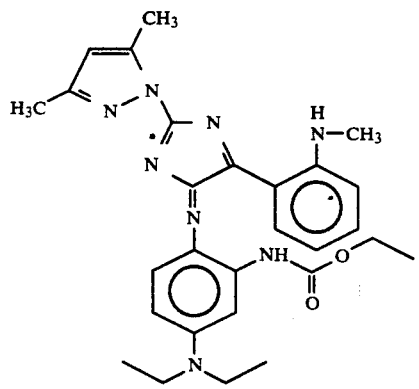
64.
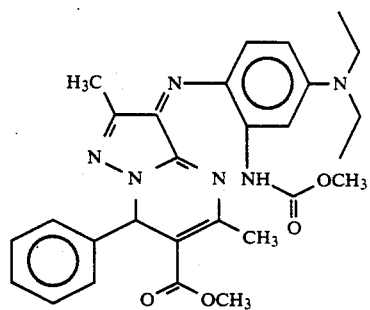
65.
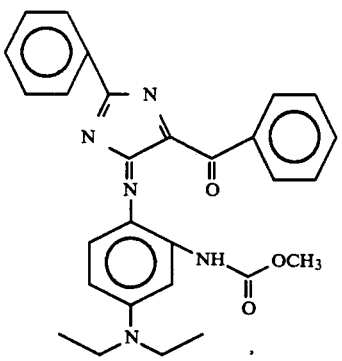
66.
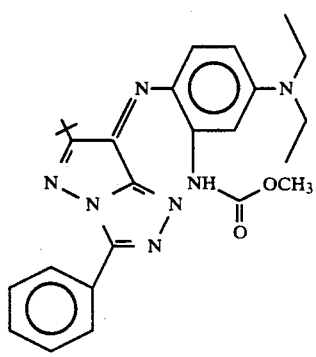
67.
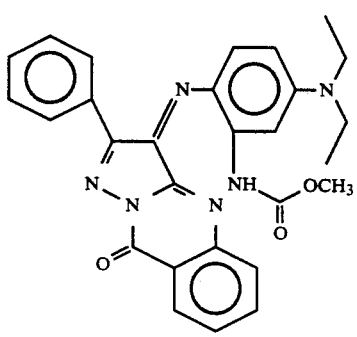

35
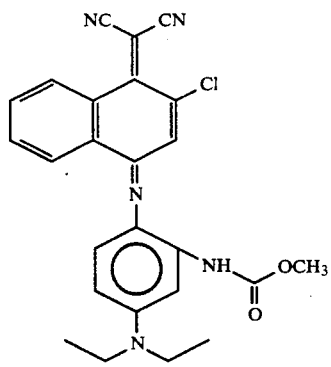
-continued
68.
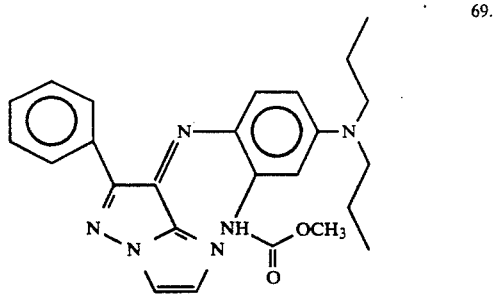
69.
70.
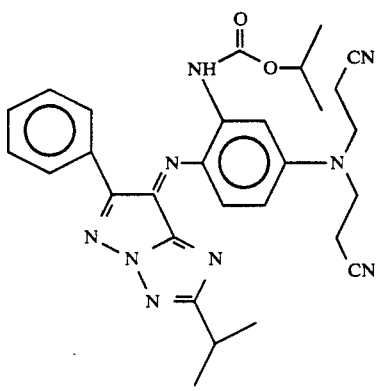
71.
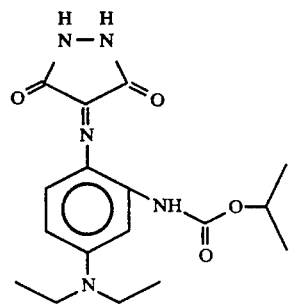
72.
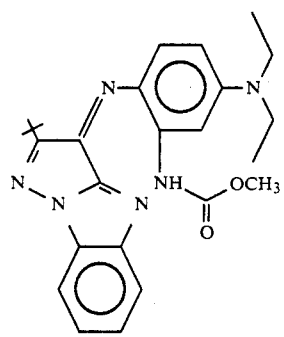
73.
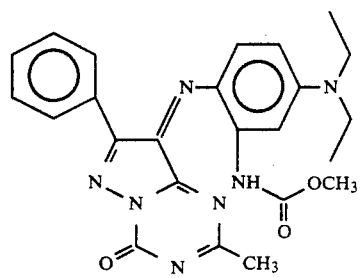
Compounds 2, 33, 39 and 61 are preferred. Dyes to be used in the present invention are produced by condensing a coupler and a compound of:
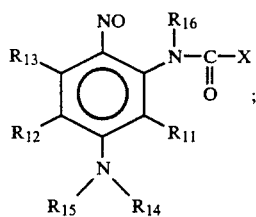
or by coupling a coupler and a compound of:
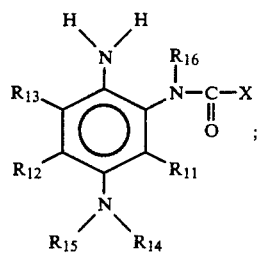
or by coupling by oxidative coupling.
Some production examples illustrating production of dyes for use in the present invention are mentioned below.

PRODUCTION EXAMPLE 1

Production of Compound (1):

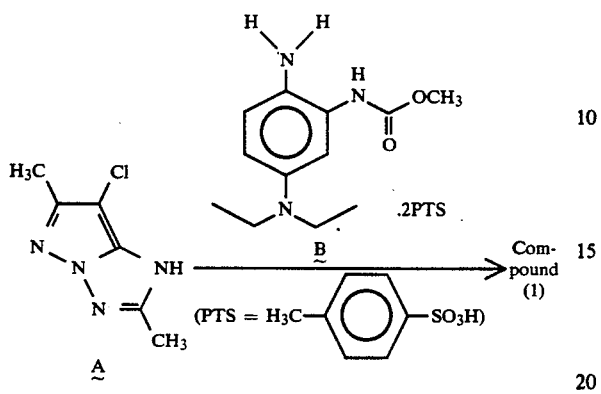

6.5 g of compound (A), 250 ml of ethanol and 250 ml of ethyl acetate were well stirred at room temperature, to which a solution of 25 g of sodium carbonate as dissolved in 250 ml of water was added. Then, 23 g of compound (B) was added thereto. Further, a solution of 8.9 g of ammonium persulfate as dissolved in 20 cc of water was added thereto and reacted for 30 minutes at room temperature. The reaction solution was extracted with ethyl acetate, dried and distilled under reduced pressure to obtain a crude product. This was purified by silica gel column chromatography, to obtain 11 g of compound (1).

PRODUCTION EXAMPLE 2

Production of Compound (2):

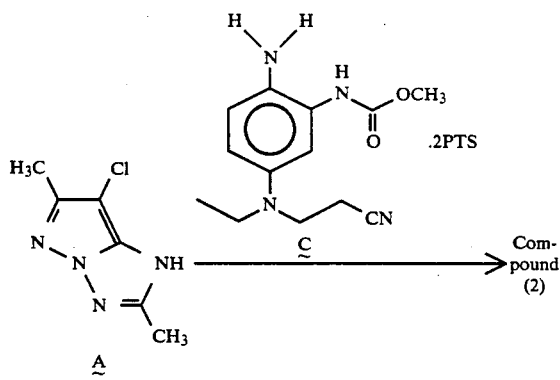

6.5 g of compound (A), 250 ml of ethanol and 250 ml of ethyl acetate were well stirred at room temperature, to which a solution of 25 g of sodium carbonate as dissolved in 250 ml of water was added. Then, 24 g of compound (C) was added thereto. Further, a solution of 8.9 g of ammonium persulfate as dissolved in 20 cc of water was added thereto and reacted for 30 minutes at room temperature. The reaction solution was extracted with ethyl acetate, dried and distilled under reduced pressure to obtain a crude product. This was purified by silica gel column chromatography, to obtain 10 g of compound (2).

PRODUCTION EXAMPLE 3

Production of Compound (29):

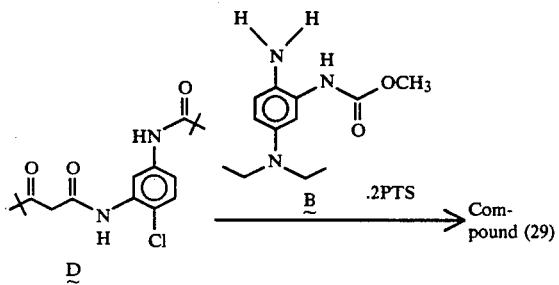

10 g of compound (D), 250 ml of ethanol and 250 ml of ethyl acetate were well stirred at room temperature, to which a solution of 25 g of sodium carbonate as dissolved in 250 ml of water was added. Then, 18 g of compound (B) was added thereto. Further, a solution of 7.0 g of ammonium persulfate as dissolved in 20 cc of water was added thereto and reacted for 30 minutes at room temperature. The reaction solution was extracted with ethyl acetate, dried and distilled under reduced pressure to obtain a crude product. This was purified by silica gel column chromatography, to obtain 15 g of compound (29).

PRODUCTION EXAMPLE 4

Production of Compound (59):

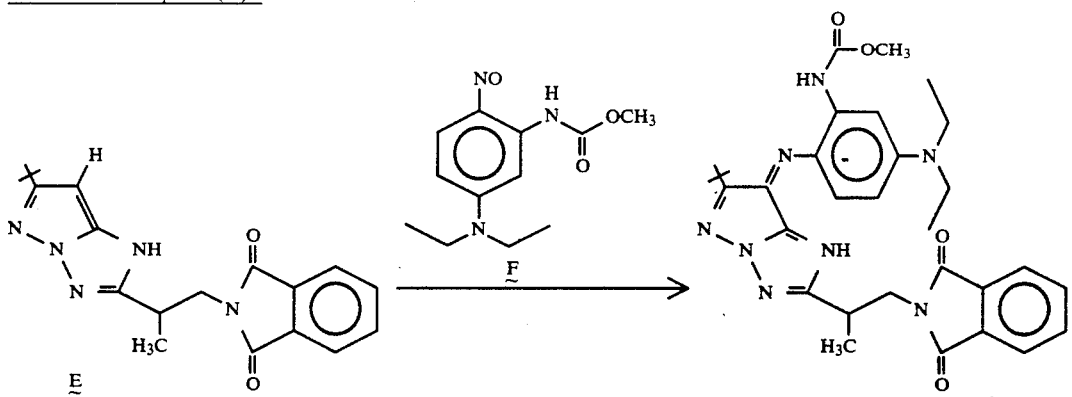

10 g of compound (E), 11 g of compound (F) and 200 g of ethanol were stirred at 30° C., to which 6 g of acetic anhydride was dropwise added. After stirring for 30 minutes, 50 cc of methanol was added to the reaction system for crystallization. The crystal formed was taken out by filtration, well washed with methanol and dried, to obtain 11 g of compound (59).

PRODUCTION EXAMPLE 5

Production of Compound (61):

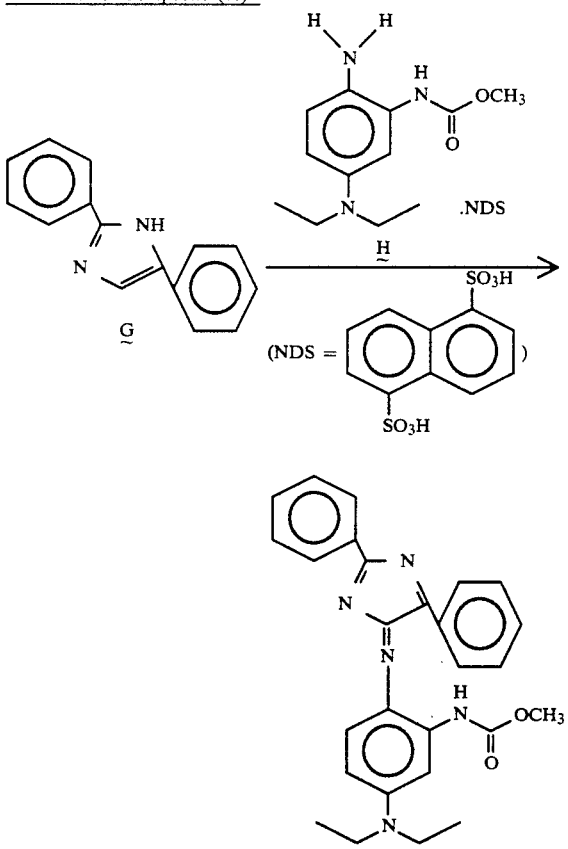

10 g of compound (AG), 200 ml of ethanol and 200 ml of ethyl acetate were well stirred at room temperature, to which a solution of 38 g of potassium carbonate as dissolved in 200 ml of water was added. Then, 36 g of compound (H) was added thereto. Further, a solution of 21 g of ammonium persulfate as dissolved in 40 cc of water was added thereto and reacted for 30 minutes at room temperature. The reaction solution was extracted with ethyl acetate, dried and distilled under reduced pressure for removing the solvent therefrom. Accordingly, a crude product was obtained. This was purified by silica gel column chromatography, to obtain 9 g of compound (61). Yield: 44%. m.p. 168° to 170° C.

The heat-transferring dye of the present invention is incorporated into the colorant layer, which is to be on the support for constructing the heat-transferring dye-containing material of the invention. The material is applied to a heat-transfer system of forming an image.

Next, the case of using the heat-transferring dye of the present invention in formation of an image by a heat-transfer system will be mentioned below in detail.

In general, three dyes of yellow, magenta and cyan dyes are necessary for constituting a full-color image.

All the necessary yellow, magenta and cyan dyes may be selected from the group of the heat-transferring dyes of the present invention and are used for forming a full-color image.

Needless to say, one or two dyes of yellow, magenta and cyan dyes are elected from the group of the heat-transferring dyes of the present invention, and the remaining two or one dye may be selected from known and conventional dyes, for forming an intended full-color image.

A mixture of the dye of the invention and a known conventional dye may be used for forming one and the same color. Also, two or more dyes of the present invention may be blended to form one and the same color.

The method of using the heat-transferring dyes of the present invention will be mentioned below.

The heat-transferring dye-donating material of the present invention is used as a sheet-like or continuous roll-like or ribbon-like form. The yellow, magenta and cyan dyes of the invention are arranged on the support generally in such a way that they form independent regions individually. For instance, a yellow dye region, a magenta dye region and a cyan dye region are arranged three-dimensionally or two-dimensionally in order, on one support. Alternatively, three dimensionally in order, on one support. Alternatively, three kinds of heat-transferring dye-donating materials each separately having the above-mentioned yellow dye, magenta dye and cyan dye on the respective different supports are prepared, and heat-transfer of images may be effected in order from each of these materials onto one image-receiving material.

The yellow dye, magenta dye and cyan dye of the invention can be coated on the support in the form of a solution or dispersion containing each dye as dissolved or dispersed in a solvent along with a binder resin, or may be printed on the support by a gravure printing method or the like printing method. The thickness of the dye-containing layer is generally from about 0.2 micron to about 5 microns, especially preferably from about 0.4 micron to about 2 microns, as a dry thickness of the layer.

The added amount of the heat transferring dye of the present invention in the dye containing layer is generally from 0.03 to 1 g/m$^2$, preferably from 0.1 to 0.6 g/m$^2$.

As the binder resin to be used along with the above-mentioned dyes, any known binder resin which is generally used for the purpose may be used. In general, resins which are highly heat-resistant and which do not interfere with transfer of dyes under heat are selected. For instance, such include polyamide resins, polyester resins, epoxy resins, polyurethane resins, polyacrylic resins (e.g., polymethyl methacrylate, polyacrylamide, polystyrene-2-acrylonitrile), vinyl resins (e.g., polyvinyl pyrrolidone), polyvinyl chloride resins (e.g., vinyl chloride-vinyl acetate copolymer), polycarbonate resins, polystyrenes, polyphenyleneoxides, cellulose resins (e.g., methyl cellulose, ethyl cellulose, carboxymethyl cellulose, cellulose acetate hydrogenated phthalate, cellulose acetate, cellulose acetate propionate, cellulose acetate butyrate, cellulose triacetate), polyvinyl alcohol resins (e.g., polyvinyl alcohol, and partially saponified polyvinyl alcohols such as polyvinyl acetal or polyvinyl butyral), petroleum resins, rosin derivatives, chromane-indene resins, terpene resins, and polyolefin resins (e.g., polyethylene, polypropylene). Polyester derivatives, cellulose derivatives, polyvinyl alcohol derivatives are preferred.

In the present invention, the binder resin is used preferably in an amount of generally from about 20 to about 600 parts by weight, preferably from 80 to 300 parts, to 100 parts by weight of dye.

As an ink solvent which is used in the present invention for dissolving and dispersing the abovementioned dye and binder resin, any known conventional ink solvent can be used.

As the support for the heat-transferring dye-donating material of the present invention, any known conventional support material may be employed. For instance, there are mentioned polyethylene terephthalate; polyamide; polycarbonate; glassine paper; condenser paper; cellulose ester; fluorine polymer; polyether; polyacetal; polyolefin; polyimide; polyphenylene sulfide; polypropylene; polysulfone; and cellophane.

The thickness of the support of the heat-transferring dye-donating material of the invention is generally from 2 to 30 microns. If desired, the support is coated with a subbing layer. Further, an interlayer for preventing diffusion of dye, which is made of a hydrophilic polymer, may be provided between the support and the dye-donating layer. By provision of such an interlayer, the density of the dye to be transferred from the material is elevated further. As the hydrophilic polymer for constituting the interlayer, the above-mentioned water-soluble polymers may be employed.

If desired, a slipping layer may be provided on the surface of the dye-donating material for the purpose of preventing sticking of a thermal head to the material. The slipping layer is composed of a lubricating substance, for example, surfactants, solid or liquid lubricants, which may contain or may not contain a polymer binder, or a mixture of such substances.

In order to prevent sticking of the dye-donating material to a thermal head due to the heat of the head and to facilitate sliding of the head over the material, when printing is effected from the back surface of the material, it is preferred to apply anti-sticking treatment to the back surface of the material which is not coated with the dye-donating layer.

For instance a heat-resistant slip layer is preferably coated on the back surface of the support, which consists essentially of (1) a reaction product of a polyvinyl butyral resin and an isocyanate, (2) an alkali metal or alkaline earth metal salt of a phosphate ester, and (3) a filler. As a polyvinyl butyral resin to be used for the purpose, one having a molecular weight of approximately from 60,000 to 200,000 and a glass transition point of from 80° to 110° C. and having a vinylbutyral content of from 15 to 40% by weight from the viewpoint of the reaction site with isocyanate is preferred. As an alkali metal or alkaline earth metal salt of a phosphate ester, RD720 (product by Toho Chemical Co.) or the like may be used. The content of the salt may be from 1 to 50% by weight, preferably from 10 to 40% by weight, to polyvinyl butyral resin.

The heat-resistant slip layer is desirably subbed with a heat-resistant subbing layer, and the subbing layer may be composed of a combination of a thermosetting synthetic resin and a hardening agent for the resin, for example, a combination of a polyvinyl butyral and a polyisocyanate, a combination of an acrylic polyol and a polyisocyanate, a combination of a cellulose acetate and a titanium chelating agent, or a combination of a polyester and an organic titanium compound.

A hydrophilic barrier layer may be provided in the dye-donating material, for the purpose of preventing diffusion of the dye into the direction of the support. The hydrophilic barrier layer to be provided for the purpose contains a hydrophilic substance which is useful for the intended object. In general, an excellent result can be obtained by employment of gelatin, poly(acrylamide), poly(isopropylacrylamide), butyl methacrylate-graft gelatin, ethyl methacrylate-graft gelatin, cellulose monoacetate, methyl cellulose, polyvinyl alcohol, polyethylene imine, polyacrylic acid, mixture of polyvinyl alcohol and polyvinyl acetate, mixture of polyvinyl alcohol and polyacrylic acid, or mixture of cellulose monoacetate and polyacrylic acid. Especially preferred are polyacrylic acid, cellulose monoacetate and polyvinyl alcohol.

The dye-donating material may have a subbing layer. A subbing layer of any kind may be employed in the present invention, provided that it displays the intended effect. As preferred examples of the materials of forming the subbing layer, there are mentioned (acrylonitrile-vinylidene chlorideacrylic acid) copolymer (14/80/6, by weight), (butyl acrylate-2-aminoethyl methacrylate-2-hydroxyethyl methacrylate) copolymer (30/20/50,by weight), linear/saturated polyesters such as Bostic 7650 (product by EM Heart Co. of Bostic Chemical Group) and chlorinated high-density poly-(ethylene-trichloroethylene) resins. The amount of the subbing layer to be coated is not specifically defined but may be, in general, from 0.1 to 2.0 g/m2

In accordance with the present invention, the heat-transferring dye-donating material is superposed on a heat-transferred image-receiving material, and heat is applied to either surface of the materials, preferably to the back surface of the heat-transferring dye-donating material, for example, by a heating means such as a thermal head, in accordance with the image information to be transferred, whereupon the dye in the dye-donating layer may be transferred to the heat-transferred image-receiving material in accordance with the amount of the heat energy as applied. As a result, a color image having an excellent sharpness and a well-resolved gradation may be obtained. In the transferring process, the anti-fading agent as contained in the dye-donating material may well be transferred to the image-receiving material.

The heating means to be employed in the transferring procedure is not limited to only thermal head but any other known means such as laser rays (e.g., semiconductor laser), infrared flash or thermal pen may also be employed in the same way as above.

In accordance with the present invention, the heat-transferring dye-donating material may be combined with a heat-transferred image-receiving material, and the combination may be utilized in printing with various printers of thermal printing system or facsimile, or in formation of print images by magnetic recording system, photomagnetic recording system or optical recording system, or in formation of print images from television or CRT picture plane.

The details of the heat-transferring recording method are described in JP-A-60-34895, which may be referred to.

The heat-transferred image-receiving material which is combined with the heat-transferring dye-donating material of the present invention has an image-receiving layer, which receives the image to be transferred from the dye-donating material, on a support. The image-receiving layer is preferably one, which contains a substance capable of receiving the dye to be transferred from the heat-transferring dye-donating material in printing and having a function of fixing the dye on the layer, singly or along with any other binder substance, and it is a film having a thickness of from 0.5 to 50 microns or so. Polymers are essentially employed as the substance for receiving the dye as transferred from the dye-donating material, and specific examples of such polymers include the following resins.

(A) Ester bond-containing resins:

These are polyester resins to be obtained by condensation of dicarboxylic acid components such as terephthalic acid, isophthalic acid or succinic acid (these may optionally have sulfone group and/or carboxyl group) and ethylene glycol, diethylene glycol, propylene glycol, neopentyl glycol or bisphenol A; polyacrylate resins or polymethacrylate resins such as polymethyl methacrylate, polybutyl methacrylate, polymethyl acrylate or polybutyl acrylate; polycarbonate resins; polyvinyl acetate resins; styrene acrylate resins; and vinyltoluene acrylate resins,. As specific examples of such resins, those described in JP-A-59-101395, JP-A-63-7971, JP-A-63-7972, JP-A-63-7973 and JP-A-60-294862 are referred to. Additionally, commercial products of Bailon 290, Bailon 200, Bailon 280, Bailon 300, Bailon 103, Bailon GK-140 and Bailon GK-130 (products by Toyo Spinning Co.) and ATR-3009 and ATR-210 (products by Kao Co.) may also be used.

(B) Urethane bond-having resins:

There are mentioned polyurethane resins.

(C) Amido bond-having resins:

There are mentioned polyamide resins.

(D) Urea bond-having resins:

There are mentioned urea resins.

(E) Sulfone bond-having resins:

There are mentioned polysulfone resins.

(F) Other high polar bond-having resins:

There are mentioned polycaprolactone resins, styrene-maleic anhydride resins, polyvinyl chloride resins and polyacrylonitrile resins. Polyester resins are preferred.

In addition to the above-mentioned synthetic resins, a mixture thereof as well as copolymers thereof may also be used.

The heat-transferred image-receiving material may contain, especially in the image-receiving layer, a high boiling point organic solvent or hot-melting solvent as a substance for receiving the heat-transferred dye or as a dye-diffusion aid.

As specific examples of high boiling point organic solvents and hot-melting solvents usable for the purpose, those described in JP-A-62-174754, JP-A-62-245253, JP-A-61-209444, JP-A-61-200538, JP-A-62-8145, JP-A-62-9348, JP-A-62-30247 and JP-A-62-136646 are referred to.

The image-receiving layer of the heat-transferred image-receiving material to be used in the present invention may be composed of a dispersion of a heat-transferred dye-receiving substance as dispersed in a water-soluble binder. As the water-soluble binder to be in the dispersion, any known water-soluble polymers may be used. Preferably, the binder is a water-soluble binder. As the water-soluble binder to be in the dispersion, any known water-soluble polymer having a group capable of being crosslinked with a hardening agent.

The image-receiving layer may be composed of two or more layers. In the case, it is desired that the layer which is nearer to the support contains a synthetic resin having a low glass transition point along with a high boiling point organic solvent or a hot-melting solvent for the purpose of elevating the dye-fixability and that the outermost layer contains a synthetic resins having a higher glass transition point along with a minimum amount of a high boiling point organic solvent or hot-melting solvent or in the absence of the solvent for the purpose of preventing the troubles of surface stickiness, sticking of surface to other substances, retransfer of the transferred dye to other substances and blocking to heat-transferring dye-donating material.

The total thickness of the image-receiving layer is preferably from 0.5 to 50 microns, especially preferably from 3 to 30 microns. Where the layer has a two-layered constitution, the thickness of the outermost layer is desirably from 0.1 to 2 microns, especially desirably from 0.1 to 1 micron.

The heat-transferred dye-receiving material to be used in the present invention may have an interlayer between the support and the image-receiving layer.

The interlayer is anyone of a cushion layer, porous layer or dye diffusion-preventing layer, depending upon the materials constituting the layer, or a layer having two or more of the functions. As the case may be, it may also have a function as an adhesive.

The dye diffusion-preventing layer has a role of preventing diffusion of the heat-transferred dye to the support. As the binder constituting the diffusion-preventing layer, a water-soluble or organic solvent-soluble substance may be used. Especially, a water-soluble binder is preferred, and the water-soluble substances as referred to above for the binder of the image-receiving layer of the material are preferably employed. Among them, gelatin is most preferred.

The porous layer is one having a role of preventing diffusion of the heat as imparted to the material in the heat-transferring step to the support from the image-receiving layer in order that the heat as imparted may effectively be utilized.

The image-receiving layer, cushion layer, porous layer, diffusion-preventing layer and adhesive layer constituting the heat-transferred image-receiving material to be used in the present invention may contain a fine powder of silica, clay, talc, diatomaceous earth, calcium carbonate calcium sulfate, barium sulfate, aluminium silicate, synthetic zeolite, zinc oxide, lithopone, titanium oxide or alumina.

As the support constituting the heat-transferred dye-receiving material to be used in the present invention, anyone which is resistant to the transferring temperature and which satisfies the necessary smoothness, whiteness, slidability, friction-resistance, antistatic property and depression-resistance in transferring may be employed. For instance, usable supports include paper supports such as synthetic papers (e.g., polyolefin or polystyrene synthetic papers), high-quality paper, art paper, coated paper, cast-coated paper, wall paper, lining paper, synthetic resin or emulsion-infiltrated paper, synthetic rubber latex-infiltrated paper, synthetic resin-incorporated paper, board paper, cellulose fiber paper or polyolefin-coated paper (especially, polyethylene-duplicated paper); various plastic films or sheets of polyolefins, polyvinyl chloride, polyethylene terephthalate, polystyrene methacrylate or polycarbonate; plastic films or sheets of the materials, as treated for imparting white-reflectivity thereto; and laminates composed of any of the above-mentioned substances.

The heat-transferred image-receiving material may contain a brightening agent. As examples, the compounds described in K. Vevnkataraman, *The Chemistry of Synthetic Dyes*, Vol. 5, Chap. 8 and JP-A-61-143752 are referred to. More precisely, there are mentioned stilbene compounds, coumarine compounds, biphenyl compounds, benzoxazolyl compounds, naphthalimide compounds, pyrazoline compounds, carbostyryl compounds, and 2,5-dibenzoxazole-thiophene compounds.

The brightening agent may be combined with an anti-fading agent.

In order to improve the releasability of the heat-transferred image-receiving material from the heat-transferring dye-donating material, after the dye has been transferred to the image-receiving material, it is desired to incorporate a release agent into the layer(s) constituting the dye-donating material and/or the image-receiving material, especially preferably into the outermost layers of the two materials which are to be in contact with each other when the materials are superposed on each other.

As the release agent there can be used anyone of solid or waxy substances such as polyethylene wax, amide wax or Teflon powder; fluorine-containing or phosphate surfactants; oils such as paraffin oil, silicone oil or fluorine-containing oil; and other conventional known release agents. Especially preferred is a silicone oil.

As the silicone oil, usable are a non-modified silicone oil as well as modified silicone oils such as carboxy-modified, amino-modified and epoxy-modified silicone oils. As examples, there are mentioned various modified silicone oils described in technical materials *Modified Silicone Oils* (pp. 6 to 18B) (published by Shin-etsu Silicone Co.). Where it is incorporated into an organic solvent-soluble binder, an amino-modified silicone oil having a group capable of reacting with the crosslinking agent of the binder (for example, a group capable of reacting with isocyanates) is preferred. Where it is emulsified and dispersed in a water-soluble binder, a carboxy-modified silicone oil (for example, X-2-3710, product by Shin-etsu Silicone Co.) is effective.

The layers constituting the heat-transferring dye-donating material and the heat-transferred image-receiving material of the present invention can be hardened with a hardening agent.

Where an organic solvent-soluble polymer is hardened, the hardening agents described in JP-A-61-99997 and JP-A-58-215398 can be used. To polyester resins, an isocyanate hardening agent is especially preferably used.

For hardening a water-soluble polymer, the hardening agents described in U.S. Pat. No. 4,678,739 (column 41), and JP-A-59-116655, JP-A-62-245261 and JP-A-61-18942 are suitably used. More precisely, there are mentioned aldehyde-type hardening agents (e.g., form-aldehyde), aziridine-type hardening agents, epoxy-type hardening agents

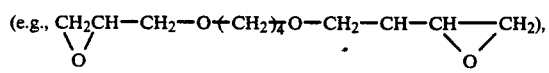

vinylsulfone type hardening agents (e.g., N,N-ethylene-bis(vinylsulfonylacetamido)ethane), N-methyloltype hardening agents (e.g., dimethylolurea) and high polymer-type hardening agents (e.g., compounds described in JP-A-62-234157).

The heat-transferring dye-donating material and the heat-transferred image-receiving material may contain an anti-fading agent. As a usable anti-fading agent, for example, there are antioxidants, ultraviolet absorbents and metal complexes of a certain kind.

Usable antioxidants include, for example, chromane compounds, coumaran compounds, phenol compounds (e.g., hindered phenols), hydroquinone derivatives, hindered amine derivatives and spiroindane compounds. Additionally, compounds described in JP-A-61-159644 are also effective.

Usable ultraviolet absorbents include, for example, benzotriazole compounds (e.g., those described in U.S. Pat. No. 3,533,794), 4-thiazolidone compounds e.g., those described in U.S. Pat. No. 3,352,681), benzophenone compounds (e.g., those described in JP-A-56-2784), and other compounds described in JP-A-54-48535, JP-A-62-136641 and JP-A-61-88256. Additionally, ultraviolet-absorbing polymers described in JP-A-62-60152 are also effective.

Usable metal complexes are, for example, compounds described in U.S. Pat. Nos. 4,241,155, 4,245,018 (columns 3 to 36), and 4,254,195 (columns 3 to 8), JP-A-62-174741 and JP-A-61-88256 (pages 27 to 29), and Japanese Patent Application Nos. 62-234103, 62-31096 and 62-230596.

Examples of usable anti-fading agents are further described in JP-A-62-215272 (pages 125 to 137).

The anti-fading agent for preventing the dye as transferred to the image-receiving material from fading may previously be incorporated into the image-receiving material, or alternatively, it may be supplied externally to the image-receiving material, for example, by transferring it from the dye-donating material.

The above-mentioned antioxidant, ultraviolet absorbent and metal complex may be used in combination.

The layers constituting the heat-transferring dye-donating material and the heat-transferred image-receiving material may contain various surfactants for the purpose of coating aid, improvement of releasability, improvement of slidability, prevention of static charges and improvement of developability.

For instance, usable surfactants include nonionic surfactants such as saponins (steroid type saponins), alkyleneoxide derivatives (for example, polyethylene glycol, polyethylene glycol alkyl ethers, polyethylene glycol alkylaryl ethers, polyethylene glycol esters, polyethylene glycol sorbitan esters, polyalkylene glycol alkylamines and amides, silicone-polyethyleneoxide adducts), glycidol derivatives (for example, alkenylsuccinic acid polyglycerides, alkyl phenol polyglycerides), fatty acid esters of polyalcohols, alkyl esters of saccharides; anionic surfactants containing acid group(s) such as carboxyl, sulfo, phospho, sulfate and/or phosphate group(s), for example, alkylcarboxylic acid salts, alkylsulfonic acid salts, alkylnaphthalenesulfonic acid salts, alkylsulfates, alkylphosphates, N-acyl-N-alkyltaurins, sulfosuccinates, sulfoalkyl-polyethylene alkylphenyl ethers, polyoxyethylene-alkyl phosphates; ampholytic surfactants such as amino acids, aminoalkylsulfonic acids, aminoalkylsulfates or phosphates, alkylbetaines, amineoxides; and cationic surfactants such as alkylamine salts, aliphatic or aromatic quaternary ammonium salts, heterocyclic quaternary ammonium salts such as pyridinium or imidazolium salts, and aliphatic or heterocyclic phosphonium or sulfonium salts. Specific examples of such surfactants are described in JP-A-62-173463 and JP-A-62-183457.

Where the heat-transferred dye-receiving substance, release agent, anti-fading agent, ultraviolet absorbent, brightening agent and other hydrophobic compounds are dispersed in a water-soluble binder, it is preferred to use a surfactant as a dispersion aid. For the purpose, surfactants described in JP-A-59-157636 (pages 37 and 38) are especially preferably used in addition to the above-mentioned surfactants.

The layer constituting the heat-transferring dye-donating material and the heat-transferred image-receiving material may contain various organic fluorine compounds for the purpose of improving the slidability, preventing static charges and improving the releasability. As specific examples of usable organic fluorine compounds, there are mentioned fluorine-containing surfactants described in JP-B-57-9034 (columns 8 to 17) (the term "JP-B" as used herein means an "examined Japanese patent publication") and JP-A-61-20944 and JP-A-62-135826; as well as hydrophobic fluorine compounds, such as fluorine oil or the like oily fluorine compounds, and ethylene tetrafluoride resins or the like solid fluorine compound resins.

The heat-transferring dye-donating material and the heat-transferred image-receiving material may contain a matting agent. As the matting agent, usable are silicon dioxide, compounds described in JP-A-61-8256 (page 26) such as polyolefins or polymethacrylates, as well as compounds described in Japanese Patent Application Nos. 62-110064 and 62-110065 such as benzoguanamine resin beads, polycarbonate resin beads and AS resin beads.

Next, the present invention will be explained in more detail by way of the following examples, which, however, are not whatsoever intended to restrict the scope of the present invention.

EXAMPLE 1

Absorption characteristics of dyes of the present invention, in the form of an ethyl acetate solution, are shown below.

| | Structure | | Absorption Maximum Wavelength (nm) | $\epsilon$ ($\times 10^{4*}$) | Half-value Width (nm) |
|---|---|---|---|---|---|
| 1 | 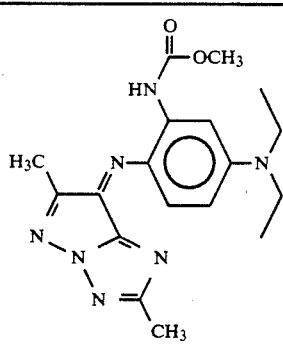 | Compound 1 (of the invention) | 547 | 6.4 | 58 |
| 2 | 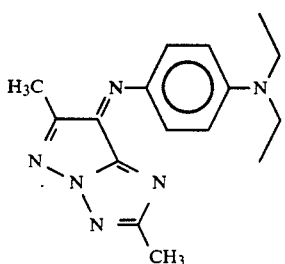 | Comparative Dye (a) | 523 | 5.4 | 66 |

-continued

| | Structure | | Absorption Maximum Wavelength (nm) | ε (×10⁴*) | Half-value Width (nm) |
|---|---|---|---|---|---|
| 3 | | Compound 2 (of the invention) | 533 | 5.8 | 63 |
| 4 | | Comparative Dye (b) | 506 | 4.7 | 67 |
| 5 | | Compound 29 (of the invention) | 450 | 2.5 | 75 |
| 6 | | Comparative Dye (c) | 435 | 1.6 | 82 |

-continued

| | Structure | | Absorption Maximum Wavelength (nm) | $\epsilon$ ($\times 10^{4*}$) | Half-value Width (nm) |
|---|---|---|---|---|---|
| 7 | [structure image] | Compound 61 (of the invention) | 620 | 8.1 | 69 |
| 8 | [structure image] | Comparative Dye (i) | 607 | 5.7 | 80 |

*unit, $l \cdot mol^{-1} \cdot cm^{-1}$

From the data above, it is noted that the dyes of the present invention (Compounds 1, 2, 29 and 61) have an extremely high extinction coefficient (e) and an extremely small half-value width (to indicate the sharpness of absorption) and therefore have an excellent absorption wave form, as compared with the corresponding comparative dyes (a, b, c and i).

EXAMPLE 2

Formation of Heat-Transferring Dye-Donating Material (A):

A polyethylene terephthalate film (made by Teijin Co.) having a thickness of 6 microns, the back surface of which had been treated to be heat-resistant and lubricative, was used as a support. A heat-transferring dye-donating layer-coating composition (A-1) composed of the components mentioned below was coated on the surface of the film support by wire-bar coating in a dry thickness of 1.5 microns, to give a heat-transferring dye-donating material sample (A).

Heat-Transferring Dye-donating Layer-Coating Composition (A-1):

| | |
|---|---|
| Dye (No. 1) | 10 mmol |
| Polyvinyl butyral rein (Denka Butural 5000-A, Product of Denki Kagaku Co.) | 3 g |
| Toluene | 40 ml |
| Methyl ethyl ketone | 40 ml |
| Polyisocyanate (Takenate D110N, product of Takeda Chemical Co.) | 0.2 ml |

Other dye-donating materials and comparative materials (B) to (S) as shown in Table 1 below were formed in the same manner as above, except that the dye was replaced by one as indicated in Table 1.

Formation of Heat-Transferred Image-Receiving Material:

A synthetic paper (YUPO-FPG-150, product of Oji Petro-Chemical Co.) having a thickness of 150 microns was used as a support, and an image receiving layer-coating composition (1) having the components mentioned below was coated on the surface thereof by wire-bar coating in a dry thickness of 8 microns, to give a heat-transferred image-receiving material (1). Drying of the coated layer was effected with a drier for pre-drying and then in an oven having a temperature of 100° C. for 30 minutes.

Image-Receiving Layer-Coating Composition (1):

| | |
|---|---|
| Polyester resin (Bailon-280, product of Toyo Spinning Co.) | 22 g |
| Polyisocyanate (KP-90, product of Dai-Nippon Ink Chemical Co.) | 4 g |
| Amino-modified Silicone Oil (KF-857, product of Shin-etsu Silicone Co.) | 0.5 g |
| Methyl ethyl ketone | 85 ml |
| Toluene | 85 ml |
| Cyclohexanone | 15 ml |

Each of the thus formed heat-transferring dye-donating materials (A) to (S) and the heat-transferred image-receiving material (1) were superposed on each other in such a manner that the heat-transferring dye-donating layer faces the image-receiving layer, whereupon a thermal head was applied to the side of the support of the heat-transferring dye-donating material under the condition of a thermal head output of 0.25 W/dot, a pulse width of from 0.15 to 15 m.sec, and a dot density of 6 dots/mm, for printing. Accordingly, yellow, magenta and cyan dyes were imagewise transferred to the image-receiving layer of the heat-transferred image-receiving material, and a sharp image with no uneven transfer was formed on the material.

The reflection spectrum of the image-recorded material was measured with a spectrophotometer (340 Type, manufactured by Hitachi, Ltd.). The results obtained are shown in Table 1 below. Comparative Dyes:

(b) and (c) were same as those in Example 1.

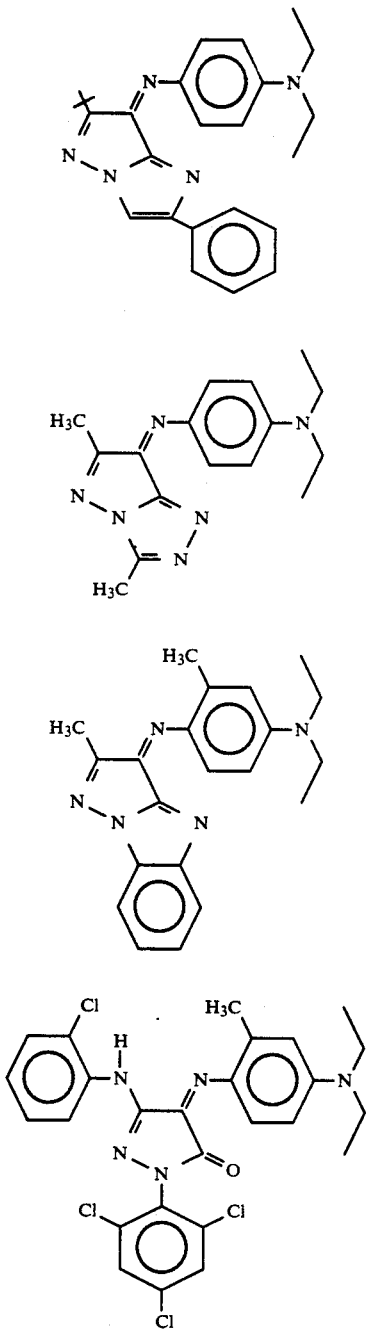

d e f g

-continued

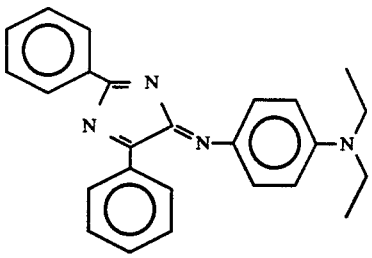

h

TABLE 1

| No. | Dye | Dye-Donating Material | Maximum Density | Half-Value Width | |
|---|---|---|---|---|---|
| 1 | 1 | (A) | 1.8 | 90 | Invention |
| 2 | 2 | (B) | 1.8 | 90 | " |
| 3 | 3 | (C) | 1.9 | 95 | " |
| 4 | 4 | (D) | 2.0 | 90 | " |
| 5 | b | (E) | 1.8 | 105 | Comp Sam. |
| 6 | 7 | (F) | 2.1 | 95 | Invention |
| 7 | 8 | (G) | 2.0 | 95 | " |
| 8 | d | (H) | 2.0 | 105 | Comp Sam. |
| 9 | 10 | (I) | 2.1 | 95 | Invention |
| 10 | 16 | (J) | 2.1 | 95 | " |
| 11 | e | (K) | 2.0 | 105 | Comp. Sam. |
| 12 | 36 | (L) | 2.1 | 95 | Invention |
| 13 | f | (M) | 2.0 | 105 | Comp. Sam. |
| 14 | 37 | (N) | 1.7 | 90 | Invention |
| 15 | g | (O) | 1.8 | 105 | Comp. Sam. |
| 16 | 33 | (P) | 1.7 | 115 | Invention |
| 17 | h | (Q) | 1.7 | 140 | Comp. Sam. |
| 18 | 28 | (R) | 1.7 | 95 | Invention |
| 19 | c | (S) | 1.6 | 110 | Comp. Sam. |
| 20 | 61 | (T) | 2.5 | 120 | Invention |
| 21 | i | (U) | 1.8 | 140 | Comp. Sam. |

As is obvious from the results in Table 1 above, the dyes of the present invention, which have an atomic group with a particular structure in the ortho-position to the color developer moiety, have a noticeably small half-value width and a sharp absorption, as compared with the corresponding dyes with no such particular structure.

EXAMPLE 3

Heat-transferring dye-donating materials (X), (Y) and (Z) were formed in the same manner as in Example 2 for forming the material (A), except that the resin and dye as indicated in Table 2 below were used in place of the polyvinyl butyral resin and dye in the composition (A-1).

Next, using each of the thus formed materials (X), (Y) and (Z) and the same image-receiving material (1) as that used in Example 2, printing of color images was effected. As a result, a sharp image with no uneven transfer was obtained in all cases, and the absorption characteristic in all cases was excellent.

TABLE 2

| No. | Resin | Dye | Maximum Density | Half-Value Width (nm) | Dye-Donating Material |
|---|---|---|---|---|---|
| 27 | Ethyl cellulose | 1 | 1.8 | 90 | (X) |
| 28 | Cellulose acetate butyrate | 2 | 1.7 | 90 | (Y) |
| 29 | Polysulfone | 3 | 1.5 | 95 | (Z) |

Formation of Heat-Transferred Image-Receiving Material:

A synthetic paper (YUPO-FPG-150, product by Oji Petro-Chemical Co.) having a thickness of 150 microns was used as a support, and an image-receiving layer-coating composition (2-1) comprising the components mentioned below was coated on the surface thereof by wire-bar coating in a dry thickness of 10 microns, to give a heat-transferred image-receiving material (2). Drying was effected with a drier for pre-drying and then in an oven having a temperature of 100° C. for 30 minutes.

Image-Receiving Layer-Coating Composition (2):

| Polyester resin No. 1 | 2.0 g |
|---|---|
| Amino-modified silicone oil (KF-857, product of Shin-etsu Silicone Co.) | 0.5 g |
| Epoxy-modified silicone oil (KF-100T, product of Shin-etsu Silicone Co.) | 0.5 g |
| Methyl ethyl ketone | 85 ml |
| Toluene | 85 ml |
| Cyclohexanone | 30 ml |

Polyester Resin No. 1:

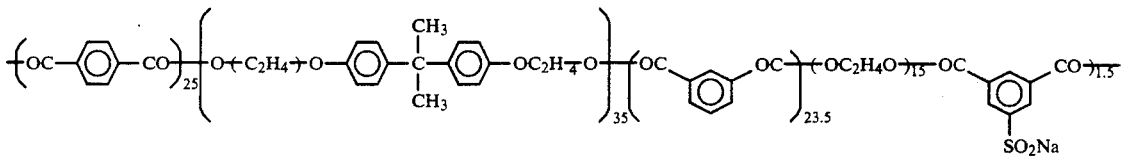

The image-receiving material thus formed was combined with each of the dye-donating materials (A), (B), (C), (D), (F), (G), (I), (J), (L), (N), (P) and (R) as formed in Examples 2 and 3 for carrying out printing of color images, whereupon sharp images having a high density were obtained in all cases.

EXAMPLE 5

Formation of Heat-Transferred Image-Receiving Material (3):

Polyethylene was laminated on both surfaces of a paper (thickness: 200 microns) in a thickness of 15 microns and 25 microns, respectively, to prepare a resin-coated paper. An image-receiving layer-coating composition (3-1) having the components mentioned below was coated on the surface of the 15 micron-polyethylene coat on the resin-coated paper support, in a dry thickness of 10 microns. After drying, a heat-transferred image-receiving material (3) was obtained.

Image-Receiving Layer-Coating Composition (3-1):

| Polyester resin No. 1 | 25 g |
|---|---|
| Amino-modified silicone oil (KF-857, product of Shin-etsu Silicone Co.) | 0.8 g |
| Polyisocyanate (KP-90 product of Dai-Nippon Ink Co.) | 4 g |
| Methyl ethyl ketone | 100 ml |
| Toluene | 100 ml |

Using the material (3), printing was carried out in the same manner as in Example 4. As a result, sharp images having a high image density were obtained.

EXAMPLE 6

An organic solvent solution of a dye-receiving polymer having the composition (B') mentioned below was dispersed in an aqueous gelatin solution having the composition (A') mentioned below, by emulsification with a homogenizer, to prepare a dye-receiving substance-containing gelatin dispersion.

| Aqueous Gelatin Solution (A'): | |
|---|---|
| Gelatin | 2.3 g |
| Sodium Dodecylbenzenesulfonate (5% aqueous solution) | 20 ml |
| Water | 80 ml |
| Dye-Receiving Polymer Solution (B'): | |
| Polyester resin (Bailon 300, product of Toyo Spinning Co.) | 7.0 g |
| Carboxy-modified silicone oil (X-22-3710, product of Shin-etsu Silicone Co.) | 0.7 g |
| Methyl ethyl ketone | 20 ml |
| Toluene | 10 ml |
| Triphenyl phosphate | 1.5 g |

A solution prepared by dissolving 0.5 g of a fluorine surfactant (a)

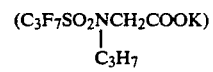

in 10 ml of a mixed solvent of water/methanol (1/1) was added to the dispersion prepared above, to give an image-receiving layer-coating composition. This was coated on a corona-discharged synthetic paper (thickness: 150 microns) (YUPO-SGG-150, product of Oji Petro-Chemical Co.) by wire-bar coating, in a wet thickness of 75 microns, and then dried.

Using each of the heat-transferring dye-donating materials prepared in Examples 2 and 3 and the heat-transferred image-receiving material (4), images were recorded in the same manner as in Example 2.

All the images obtained were sharp and had a high image density and a high image fastness.

EXAMPLE 7

Formation of Heat-Transferred Image-Receiving Material (5):

Using an image-receiving layer-coating composition (5-1) having the components mentioned below, a heat-transferred image-receiving material (5) was formed in the same manner as in Example 1.

Image-Receiving Layer-Coating Composition (5-1):

This is the same as the image-receiving layer-coating composition (1-1) of Example 2, except that 7 g of the following ultraviolet absorbent was added.

Ultraviolet Absorbent:

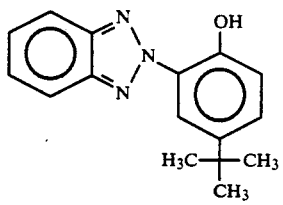

(5)

The material (5) was combined with each one of the heat-transferring dye-donating materials (A), (B), (C), (D), (F), (G), (I), (J), (L), (N), (P) and (R) of Example 2 for conducting printing, whereupon sharp images having a high image density were formed in every case. The image fastness of the images formed was higher than that of the images formed on the heat-transferred image-receiving material (1).

EXAMPLE 8

Heat-transferring Dye-donating materials (8-1) to (8-6) were prepared in the same manner as in the preparation of heat-transferring Dye-donating materials (B) to (U) of Example 2. By using them, the test of light-fastness and heat-fastness was carried out.

First, the transferring was carried out in the same manner as in Example 2. The obtained recorded heat-transferred image-receiving materials were subject to the exposure for 3 days by means of fluorescent lamp (12,000 lux). The reflection density of status A was measured before and after the exposure. The stability of the image was evaluated by the ratio of the value after the exposure to the value before the exposure. The measurement was carried out at a part having a density of 1.0 and the result was shown as percentage.

Furthermore, the obtained recorded heat-transferred image-receiving materials were subject to the compulsory heat discoloration test, under dry condition, at 60° C. for 10 days. The measurement was carried out at a part having a density of 1.0. The method of the measurement and the notation are the same as in the light-fastness test.

TABLE 3

| No. | Dye Donating Material | Dye | Remaining ratio of Light-fastness (%) | Remaining ratio of Heat-fastness (%) | Remarks |
|---|---|---|---|---|---|
| 1 | 8-1 | i | 75 | 93 | Invention |
| 2 | 8-2 | j | 55 | 84 | Comparison |
| 3 | 8-3 | 2 | 95 | 97 | Invention |
| 4 | 8-4 | k | 89 | 89 | Comparison |
| 5 | 8-5 | 30 | 71 | 83 | Invention |
| 6 | 8-6 | l | 70 | 80 | Comparison |

It is seen from Table 3 that the images obtained by using the dyes of the present invention provide higher light-fastness and heat-fastness than the images formed the dyes where the ortho position is substituted by an acetylamino group.

In addition, the tests for the comparison between Dye 7, 10, 72, 22, 50 and 61 of the present invention and comparative dyes m, o, p, q, r and s were carried out in the same manner as the above. The dyes of the present invention provided images having superiority in light-fastness and heat-fastness to those the comparative dyes do.

Comparative Dyes

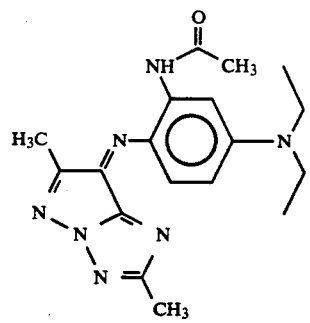

j

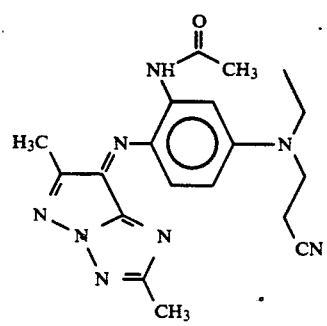

k

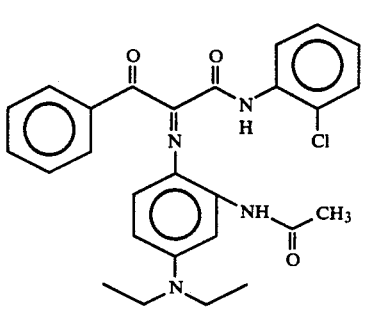

l

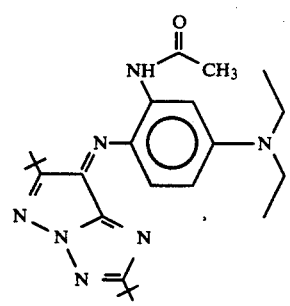

m

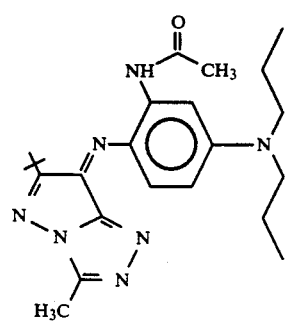

o

-continued
Comparative Dyes

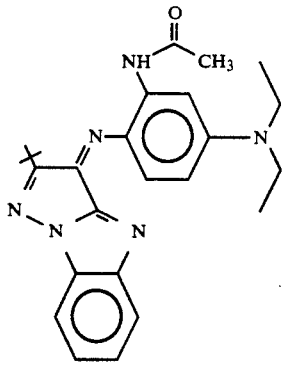

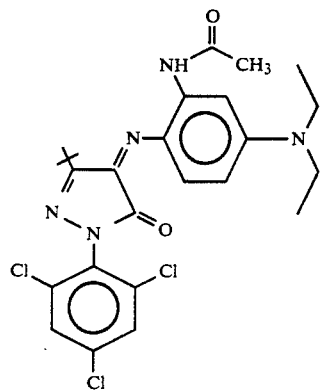

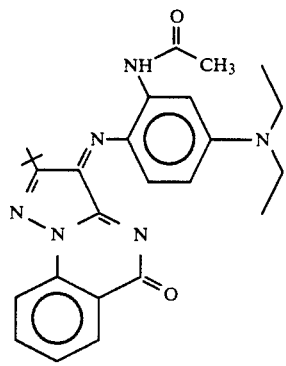

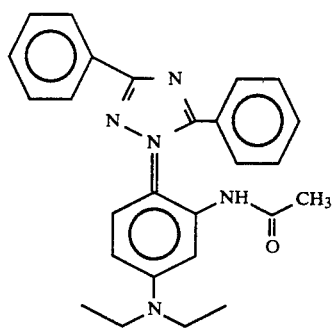

As is obvious from the above-mentioned explanation, sharp images having a high image density and a high image fastness are formed by the use of the heat-transferring dye-donating material of the present invention.

While the invention has been described in detail and with reference to specific embodiments thereof, it will be apparent to one skilled in the art that various changes and modifications can be made therein without departing from the spirit and scope thereof.

What is claimed is:

1. A heat-transferring dye-donating material having a heat-transferring dye-donating layer containing a heat transferring dye on a support, wherein the heat-transferring dye is an azomethine dye represented by formula (Ib):

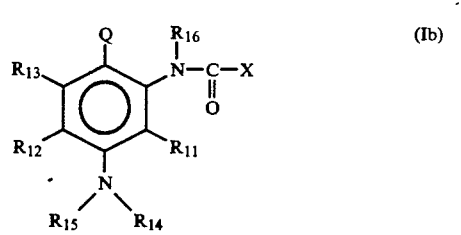

where X represents an alkoxy group, an aryloxy group or an amino group;

$R_{11}$, $R_{12}$ and $R_{13}$ independently represent a hydrogen atom or a non-metallic atomic group;

$R_{14}$ and $R_{15}$ independently represent a hydrogen atom, an alkyl group, an aryl group or a heterocyclic group;

$R_{16}$ represents a hydrogen atom or an alkyl group;

$R_{12}$ and $R_{13}$, and/or $R_{12}$ and $R_{15}$, and/or $R_{15}$ and $R_{14}$, and/or $R_{11}$ and $R_{14}$, and/or $R_{11}$ and $R_{14}$, and/or X and $R_{11}$, and/or X and $R_{16}$, and/or $R_{16}$ and $R_{11}$ may be bonded to each other to form a ring structure; and Q represents a non-metallic atomic group necessary for forming a coloring system and is selected from the group consisting of formulas (II) to (XIV):

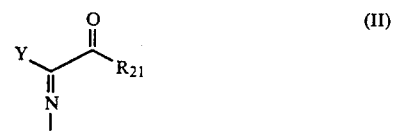

where $R_{21}$ represents an alkyl group, an amino group, an anilino group, an aryl group, or a heterocyclic group;

Y represents a heterocyclic group, an aryl group, or

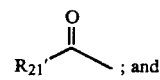

; and $R_{21'}$ represents an alkyl group, an aryl group, an amino group or an anilino group;

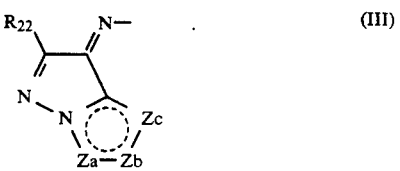

where $R_{22}$ represents a hydrogen atom, or a non-metallic substituent; Za, Zb and Zc independently represent $-N=$ or

and $R_{23}$ represents a hydrogen atom, or a non-metallic substituent;

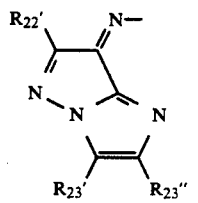 (IV)

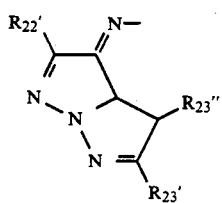 (V)

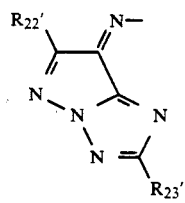 (VI)

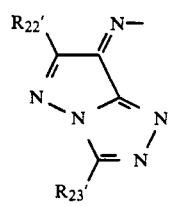 (VII)

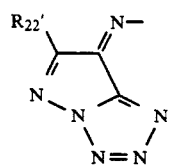 (VIII)

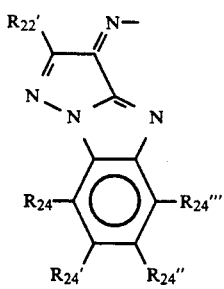 (IX)

where $R_{22}$, are the same as defined for $R_{11}$, $R_{12}$ and $R_{13}$ in formula (Ib); $R_{23}$ and $R_{23'}$ independently represent a hydrogen atom, or a non-metallic substituent; and $R_{24}$, $R_{24'}$, $R_{24''}$, $R_{24'''}$ are independently the same as defined for $R_{11}$, $R_{12}$ and $R_{13}$ in formula (Ib);

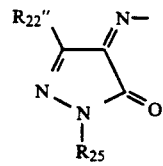 (X)

wherein $R_{22''}$ represents a hydrogen atom, an acylamino group, an anilino group, or an alkyl group; and $R_{25}$ represents a hydrogen atom, or a non-metallic substituent;

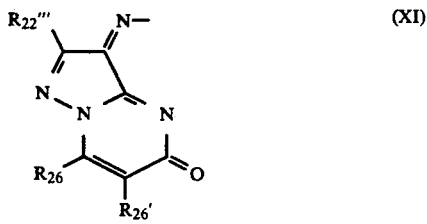 (XI)

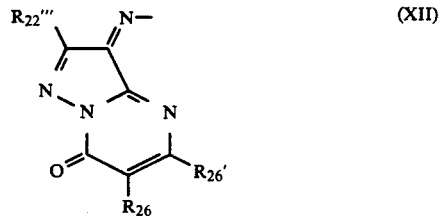 (XII)

wherein $R_{22'''}$ are the same as defined for $R_{11}$, $R_{12}$ and $R_{13}$ in formula (Ib); and $R_{26}$ and $R_{26'}$ independently represent a hydrogen atom or a non-metallic substituent;

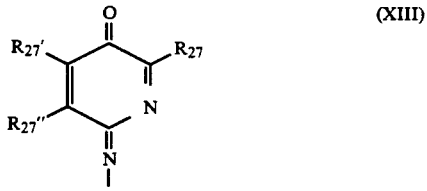 (XIII)

where $R_{27}$, $R_{27'}$ and $R_{27''}$ are independently the same as defined for $R_{11}$, $R_{12}$ and $R_{13}$ in formula (Ib);

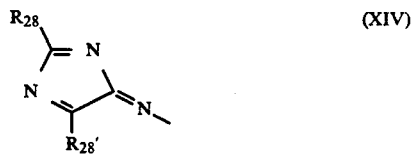 (XIV)

where $R_{28}$ and $R_{28'}$ independently are the same as defined for $R_{11}$, $R_{12}$ and $R_{13}$ in formula (Ib).

2. The heat-transferring dye-donating material as in claim 1, wherein Q is represented by formula (II).

3. The heat-transferring dye-donating material as in claim 1, wherein the heat-transferring dye-donating layer contains the heat-transferring dye in an amount of from 0.1 to 0.6 g/m².

4. The heat-transferring dye-donating material as in claim 1, wherein Q is represented by formula (III).

5. The heat-transferring dye-donating material as in claim 4, wherein the heat-transferring dye-donating layer contains the heat-transferring dye in an amount of from 0.1 to 0.6 g/m².

6. The heat-transferring dye-donating material as in claim 1, wherein Q is selected from the group consisting of formulas (IV), (V), (VI), (VII), (VIII) and (IX).

7. The heat-transferring dye-donating material as in claim 6, wherein the heat-transferring dye-donating layer contains the heat-transferring dye in an amount of from 0.1 to 0.6 g/m².

8. The heat-transferring dye-donating material as in claim 1, wherein Q is represented by formula (X).

9. The heat-transferring dye-donating material as in claim 8, wherein the heat-transferring dye-donating layer contains the heat-transferring dye in an amount of from 0.1 to 0.6 g/m².

10. The heat-transferring dye-donating material as in claim 1, wherein Q is selected from the group consisting of formulas (XI) and (XII).

11. The heat-transferring dye-donating material as in claim 10, wherein the heat-transferring dye-donating layer contains the heat-transferring dye in an amount of from 0.1 to 0.6 g/m².

12. The heat-transferring dye-donating material as in claim 1, wherein Q is represented by the formula (XIII).

13. The heat-transferring dye-donating material as in claim 12, wherein Q is an 1-dicyanovinylidene-2-chloro-5,6-benzo-2,5-cyclohexadiene-4-ylidene imino group.

14. The heat-transferring dye-donating material as in claim 12, wherein the heat-transferring dye is 15. The heat-transferring dye-donating material as in claim 12, wherein the heat-transferring dye-donating layer contains the heat-transferring dye in an amount of from 0.1 to 0.6 g/m².

16. The heat-transferring dye-donating material as in claim 1, wherein Q is represented by formula (XIV).

17. The heat-transferring dye-donating material as in claim 16, wherein the heat-transferring dye-donating layer contains the heat-transferring dye in an amount of from 0.1 to 0.6 g/m².

18. The heat-transferring dye-donating material as in claim 1, wherein the heat-transferring dye-donating layer contains the heat-transferring dye in an amount of from 0.1 to 0.6 g/m².

19. A heat-transferring dye-donating material having a heat-transferring dye-donating layer containing a heat transferring dye on a support, wherein the heat-transferring dye is an azomethine dye represented by formula (Ib):

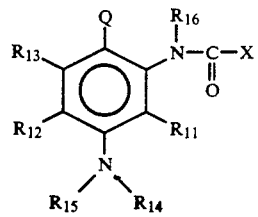

where X represents an alkoxy group, an aryloxy group or an amino group;

$R_{11}$, $R_{12}$ and $R_{13}$ independently represent a hydrogen atom or a non-metallic atomic group;

$R_{14}$ and $R_{15}$ independently represent a hydrogen atom, an alkyl group, an aryl group or a heterocyclic group;

$R_{16}$ represents a hydrogen atom or an alkyl group;

$R_{12}$ and $R_{13}$, and/or $R_{12}$ and $R_{15}$, and/or $R_{15}$ and $R_{14}$, and/or $R_{11}$ and $R_{14}$, and/or $R_{11}$ and $R_{14}$, and/or X and $R_{11}$, and/or X and $R_{16}$, and/or $R_{16}$ and $R_{11}$ may be bonded to each other to form a ring structure; and Q represents a non-metallic atomic group necessary for forming a coloring system and is selected from the group consisting of formulas (XV) and (XVI):

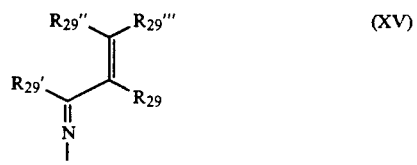

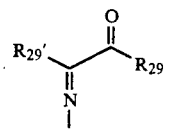

wherein $R_{29}$, $R_{29'}$, $R_{29''}$, $R_{29'''}$ are independently the same as defined for $R_{11}$, $R_{12}$ and $R_{13}$ in formula (Ib) with the exception of a halogen atom.

20. The heat-transferring dye-donating material as in claim 19, wherein the heat-transferring dye-donating layer contains the heat-transferring dye in an amount of from 0.1 to 0.6 g/m².

* * * * *